United States Patent
Vaes et al.

(10) Patent No.: US 11,458,539 B2
(45) Date of Patent: Oct. 4, 2022

(54) APPARATUS FOR PRODUCING AN OBJECT BY MEANS OF ADDITIVE MANUFACTURING

(71) Applicant: ADDITIVE INDUSTRIES B.V., AJ Eindhoven (NL)

(72) Inventors: Mark Herman Else Vaes, AJ Eindhoven (NL); Rob Peter Albert Van Haendel, AJ Eindhoven (NL); Mark Johannes Magielsen, AJ Eindhoven (NL); Chris Patrick Webb, AJ Eindhoven (NL); Daniel Anthonius Johannes Kersten, AJ Eindhoven (NL); Jonas Wintermans, AJ Eindhoven (NL); Adrianus Johannes Petrus Maria Vermeer, AJ Eindhoven (NL); Johannes Franciscus Willebrordus Peeters, AJ Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 756 days.

(21) Appl. No.: 15/528,892

(22) PCT Filed: Nov. 24, 2015

(86) PCT No.: PCT/NL2015/050819
§ 371 (c)(1),
(2) Date: May 23, 2017

(87) PCT Pub. No.: WO2016/085334
PCT Pub. Date: Jun. 2, 2016

(65) Prior Publication Data
US 2018/0354034 A1 Dec. 13, 2018

(30) Foreign Application Priority Data

Nov. 24, 2014 (NL) .................................. 2013860
Nov. 24, 2014 (NL) .................................. 2013861
(Continued)

(51) Int. Cl.
*B22F 10/20* (2021.01)
*B29C 64/393* (2017.01)
(Continued)

(52) U.S. Cl.
CPC .............. *B22F 10/20* (2021.01); *B22F 12/90* (2021.01); *B29C 64/277* (2017.08);
(Continued)

(58) Field of Classification Search
CPC ......... B22F 3/1055; B22F 12/85; B22F 12/90
See application file for complete search history.

(56) References Cited

U.S. PATENT DOCUMENTS

| 4,660,981 A | 4/1987 | Stridsberg |
| 4,818,562 A | 4/1989 | Arcella et al. |

(Continued)

FOREIGN PATENT DOCUMENTS

| CN | 103 414 792 A | 11/2013 |
| DE | 10 2005 025 348 A1 | 12/2006 |

(Continued)

OTHER PUBLICATIONS

International Search Report for PCT/NL2015/050819 dated Jul. 27, 2016.

*Primary Examiner* — Christopher S Kessler
(74) *Attorney, Agent, or Firm* — Suiter Swantz pc llo

(57) ABSTRACT

An apparatus for producing an object by additive manufacturing including a chamber for receiving a bath of material solidified by exposure to electromagnetic radiation, a sup-
(Continued)

port for positioning the object, and a solidifying device for solidifying a layer of the material. A registering device registers a characteristic of a calibration area related to the surface level of the bath of material and a control unit utilizes the characteristic to control the position of the emitted electromagnetic radiation.

9 Claims, 27 Drawing Sheets

(30) Foreign Application Priority Data

| Nov. 24, 2014 | (NL) | ................................ | 2013862 |
| Nov. 24, 2014 | (NL) | ................................ | 2013863 |
| Nov. 24, 2014 | (NL) | ................................ | 2013864 |
| Nov. 24, 2014 | (NL) | ................................ | 2013865 |
| Nov. 24, 2014 | (NL) | ................................ | 2013866 |

(51) Int. Cl.

| *B29C 64/277* | (2017.01) |
| *B22F 12/90* | (2021.01) |
| *B33Y 10/00* | (2015.01) |
| *B33Y 30/00* | (2015.01) |
| *B33Y 50/02* | (2015.01) |
| *B33Y 40/00* | (2020.01) |
| *B22F 10/30* | (2021.01) |

(52) U.S. Cl.
CPC ............ *B29C 64/393* (2017.08); *B33Y 10/00* (2014.12); *B33Y 30/00* (2014.12); *B33Y 50/02* (2014.12); *B22F 10/30* (2021.01); *B33Y 40/00* (2014.12)

(56) References Cited

U.S. PATENT DOCUMENTS

| 4,918,284 | A | 4/1990 | Weisz |
| 5,133,987 | A | 7/1992 | Spence et al. |
| 5,832,415 | A | 11/1998 | Wilkening et al. |
| 2003/0205851 | A1 | 11/2003 | Laschutza et al. |
| 2006/0108712 | A1 | 5/2006 | Mattes |
| 2007/0100492 | A1 | 5/2007 | Idaka et al. |
| 2010/0292947 | A1 | 11/2010 | Buk |
| 2012/0092724 | A1 | 4/2012 | Pettis |
| 2013/0186871 | A1 | 7/2013 | Suzuki et al. |

FOREIGN PATENT DOCUMENTS

| DE | 102013208651 | A1 | 11/2014 |
| JP | H08318574 | A | 12/1996 |
| JP | 2008264789 | A | 11/2008 |
| JP | 5311396 | B | 10/2013 |
| KR | 101 400 875 | B1 | 6/2014 |
| WO | 94 16875 | A1 | 8/1994 |
| WO | 2007147221 | A1 | 12/2007 |
| WO | 2009026520 | A1 | 2/2009 |
| WO | 2009108543 | A2 | 9/2009 |
| WO | 2010005394 | A1 | 1/2010 |
| WO | 2012019577 | A2 | 2/2012 |
| WO | 2013 036942 | A1 | 3/2014 |
| WO | 2015040433 | A2 | 3/2015 |
| WO | 2016026853 | A1 | 2/2016 |

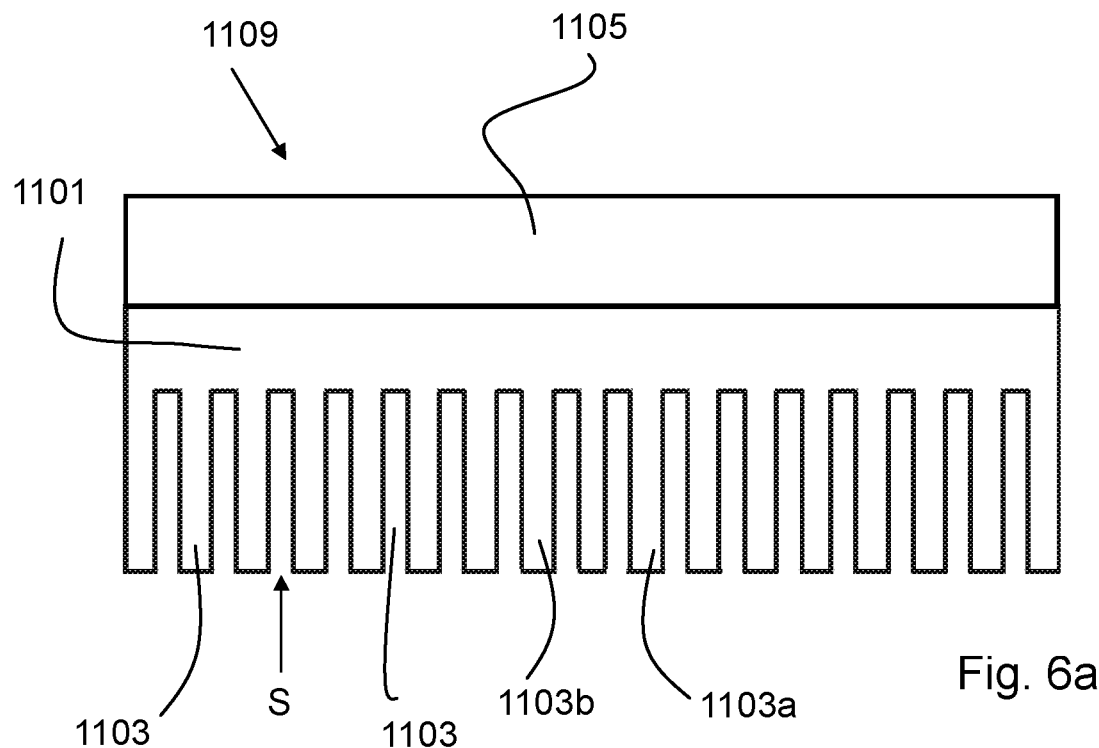
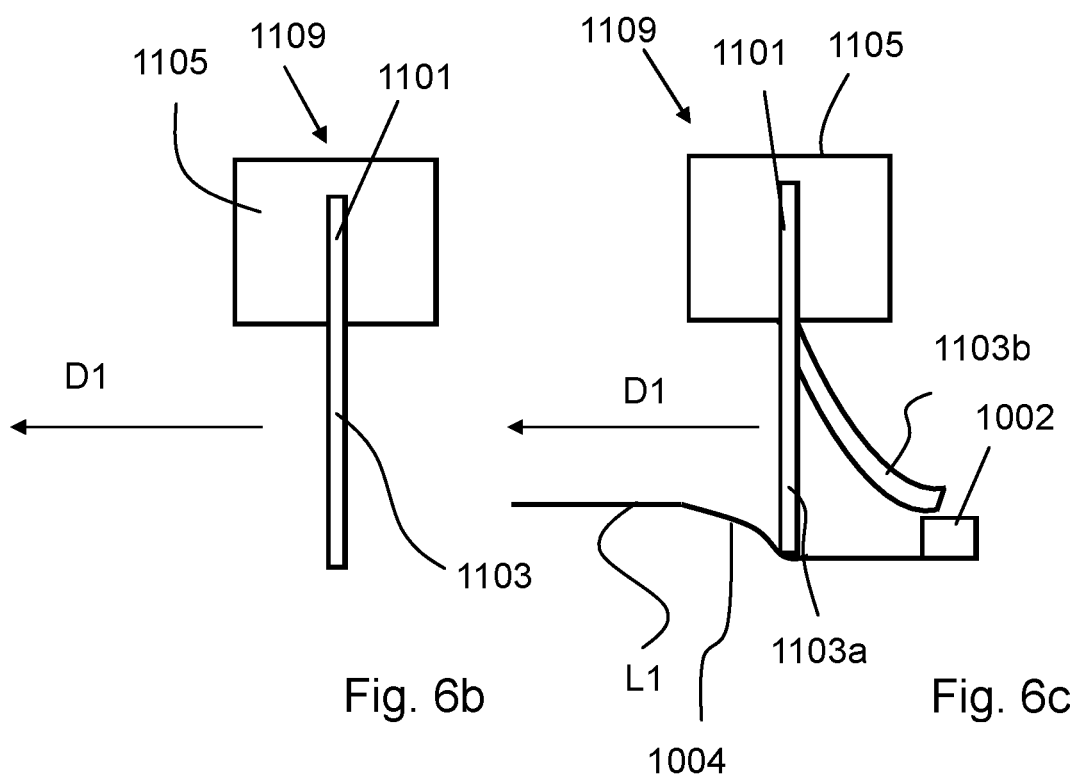

APPARATUS FOR PRODUCING AN OBJECT BY MEANS OF ADDITIVE MANUFACTURING

BACKGROUND

The invention, from a first point of view, relates to an apparatus for producing an object by means of additive manufacturing, comprising a process chamber for receiving a bath of material which can be solidified by exposure to electromagnetic radiation; a support for positioning the object in relation to the surface level of the bath of material; and a solidifying device for solidifying a layer of the material on the surface level by means of electromagnetic radiation.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is how to accurately solidify selective parts of the layer.

U.S. Pat. No. 5,832,415 discloses a method for calibrating the deflection control of a laser beam. The method disclosed comprises the step of producing a test pattern with the laser beam. Actual positions of the laser beam on the digitized test pattern are compared to predetermined desired coordinates. This information is used to generate a correction table. The correction table is then used to control the deflection of the laser beam.

The accuracy and speed of calibration obtained with the known method does not satisfy the current demands in additive manufacturing.

BRIEF SUMMARY

It is therefore an object of the invention to improve the accuracy of the apparatus for producing an object by means of additive manufacturing.

To this end, the invention, from a first point of view, provides an apparatus for producing an object by means of additive manufacturing, comprising:
  a process chamber for receiving a bath of material which can be solidified by exposure to electromagnetic radiation;
  a support for positioning the object in relation to the surface level of the bath of material;
  a solidifying device for solidifying a selective layer-part of the material on the surface level by means of electromagnetic radiation;
  a registering device for registering a characteristic related to the surface level of the bath of material; and
  a control unit connected to the registering device and arranged for using the characteristic obtained by the registering device for controlling the position of the electromagnetic radiation emitted by the solidifying device.

The apparatus according to the invention, from a first point of view, comprises a registering device for registering a characteristic related to the surface level of the bath of material. The apparatus furthermore comprises a control unit connected to the registering device and arranged for using the characteristic obtained by the registering device for controlling the position of the electromagnetic radiation emitted by the solidifying device. With this, the registering device, and the control unit are arranged for calibrating, or controlling, a position of the electromagnetic radiation generated by the solidifying device on the surface level of the bath of material, such that a more accurate positioning of said radiation is possible. This enables direct feedback, and renders possible quick and cost-effective calibration. Rather than creating a test pattern, which is evaluated off-site, the registering device may also used to register a characteristic related to the surface level of the bath of material on-site, and this information may be directly (on-site) fed to the control unit, which is able to control, directly or indirectly, at least the position on the surface level of the electromagnetic radiation generated by the solidifying device. Hence, the invention provides an apparatus with which direct calibration is possible, using the registering device. With this, it is possible to calibrate the apparatus more often and more cost-effective, since the time-consuming and expensive off-site evaluation of a test pattern is not necessary anymore. This allows for compensating of irregularities, especially those having a small time-scale or high frequency, such as thermo-mechanical deformations. This leads to improved accuracy of the device according to the invention. With this, the object of the invention is achieved.

According to the invention, the control unit is arranged to use the characteristic obtained by the registering device for controlling the position of the electromagnetic radiation emitted by the solidifying device. This may be performed during the solidifying process, i.e. when the solidifying device is solidifying a selective layer-part of the material on the surface level by means of electromagnetic radiation, or may be performed in a more offline setting, i.e. when the solidifying device is not solidifying the selective layer-part of the material on the surface level. Both situations are covered by the present invention.

As stated above, the characteristic related to the surface level of the bath may be a characteristic of a calibration area related to said surface level of the bath. Said characteristic may be a geometric characteristic, and is in particular related to a position within or on a plane defined by the surface level of the bath, i.e. an XY-position. Specifics of the characteristic will become apparent from the following description.

According to the invention, the registering device comprises at least one imaging device, in particular an optical imaging device, such as a camera unit. The imaging device is arranged for registering an image of the calibration area related to the surface level of the bath of material, which yields information about the calibration area, which is related to the surface level of the bath of material. This characteristic may be used to control the solidifying device for controlling the position of electromagnetic radiation on the surface level of the bath of material.

Furthermore, the apparatus comprises at least one calibration element provided on or near the support, for instance on or near the surface level of the bath of material, wherein the control means are arranged for controlling the solidifying device based on a geometric characteristic of the calibration element registered by the registering device.

With the invention as defined in this first point of view, it is possible to obtain the characteristic during manufacturing of a single product, for instance in between the manufacturing of different individual layers of said product, for example after manufacturing of each single layer, and for using the characteristic obtained by the registering device in these different instances for controlling the position of the electromagnetic radiation emitted by the solidifying device during manufacturing of a subsequent layer. This allows a precise control, and adjustment, during manufacturing of a single product.

In particular, this makes it possible to guide the solidifying device to the calibration element, and to view, using the imaging device, the characteristic created by the solidifying device on or near the calibration element. Viewing may be done whilst creating the characteristic, or after the characteristic has been created. In any event, this provides information with which the device can be calibrated. Manual or automated optimisation schemes making use of the images obtained by the imaging device may be used to direct the solidifying device on to the calibration element.

According to the present invention, the characteristic may be a geometric characteristic, for example in the form of a circle, parallel lines, a triangle, a pentagon, etc, or a spot.

Furthermore, in case the characteristic is a spot, the spot size created by the solidifying device can be viewed, this also allows for a spot size calibration of the solidifying device.

Further, the sharpness, i.e. focus, of the characteristic can be viewed, allowing for a focus calibration of the solidifying device. The sharpness can, for example, be determined based on contrast transitions, width of particular solidified lines, etc.

Further advantageous embodiments of the invention from a first point of view are described in the depending claims. Some of these will be elucidated below.

In an embodiment the imaging device is arranged for making an image of the calibration element, and wherein the registering device is arranged for determining the geometric characteristic of the calibration element based on the image obtained by the imaging device. An image of the calibration element may be taken by means of the imaging device, for example, and the image obtained provides information on the geometric position of the calibration element with respect to the surface level of the bath of material. Information obtained from evaluation of the image, for example by the imaging device or by the control means, may be used to calibrate or control the position of the electromagnetic radiation emitted by the solidifying device.

In an embodiment the imaging device is arranged such that an optical path of the imaging device, during use of the imaging device, at least partly coincides with an optical path of the electromagnetic radiation generated by the solidifying device, during use of the solidifying device. This provides the advantage that the imaging device uses the same, or at least partially the same, optical path as the solidifying device. The part of the calibration area viewed by the imaging device thus substantially directly corresponds to the position of the electromagnetic radiation on the surface level of the bath of material to be solidified. This gives a more direct feedback between the image obtained and the controlling, or calibration, of the solidifying device.

In an embodiment the apparatus comprises a deflector unit, which is arranged for deflecting electromagnetic radiation emitted by the solidifying device towards the surface level of the bath of material, and wherein the imaging device is arranged such that the characteristic is registered via the deflector unit. As described above, the image obtained by the imaging device via the deflector unit then relates, or even substantially corresponds to the position of electromagnetic radiation emitted by the solidifying device via the deflector unit. It should be noted in this sense, that the term controlling the solidifying device expressly includes those cases wherein the position of the electromagnetic radiation emitted by the solidifying device is controlled by means of controlling the deflector unit.

In an embodiment the apparatus comprises a plurality of calibration elements provided on or near the support, for instance on or near the surface level of the bath of material. A plurality of calibration elements improves the accuracy of the calibration, and thus improves the accuracy with which the electromagnetic radiation may be positioned on the surface level of the bath.

In an embodiment, at least one of the plurality of calibration elements is assigned to a registering frame comprising the registering device, and wherein at least one of the plurality of calibration elements is assigned to a support frame comprising the support. This embodiment provides the advantage that temperature gradients within the apparatus and subsequent effects of thermal expansion may be registered. In particular, by using calibration elements on both the registering frame and the support frame, it is possible to account for differences in thermal expansion, for instance due to different operating temperatures, or different thermal expansion coefficients. In an embodiment, the solidifying device or a deflection unit belonging to said solidifying device is also assigned to the registering frame as well. This way, the thermal effects registered by the registering device may be used for more accurately controlling the position of the electromagnetic radiation emitted by the solidifying device.

According to an aspect, the invention, from a first point of view, provides a method for calibrating an apparatus for producing an object by means of laser sintering, in particular an apparatus according to the invention as described above.

The apparatus comprises a process chamber for receiving a bath of material which can be solidified by exposure to electromagnetic radiation, a support for positioning the object in relation to the surface level of the bath of material, and a solidifying device for solidifying a layer of the material on the surface level by means of electromagnetic radiation. The method according to the invention comprises the step of registering a characteristic related to the surface level of the bath of material, and using the characteristic for controlling the position of electromagnetic radiation emitted by the solidifying device. Advantages of the method have been explained in the foregoing with respect to the apparatus according to the invention.

In an embodiment, the step of registering comprises the step of obtaining an image of at least part of the calibration area.

In an embodiment, the step of registering comprises the step of obtaining an image of a calibration element provided on or near the support.

In an embodiment, the apparatus further comprises a registering device for registering the characteristic related to the surface level of the bath of material, and a control unit connected to the registering device, wherein the method comprises the step of feeding the characteristic to the control unit, and using the control unit for controlling the position of the electromagnetic radiation emitted by the solidifying device.

In an embodiment, the method comprises the step of repeating the step of registering the characteristic at least once during the production of the object. The invention according to this embodiment provides the advantage that the calibration may be performed even during a single cycle of producing one or more objects by means of additive manufacturing.

In an embodiment, the method comprises the step of solidifying the layer of material, and wherein the step of repeating the step of registering the characteristic is performed after the step of solidifying.

In an embodiment, the method comprises the step of moving the support after the layer of material has been solidified, adding further material for generating a further layer of material to be solidified, and solidifying the further layer using the solidifying device.

The calibration may in this way be performed in between the solidifying of different layers of a single object. This improves the accuracy, since it accounts for changes and disturbances occurring during the production of a single object.

It is thinkable to make an image of the electromagnetic radiation emitted by the solidifying device, and using this image for controlling the position thereof. This provides a direct feedback.

In an embodiment, the method comprises the step of only registering the characteristic when the solidifying device is free from emitting electromagnetic radiation.

The present invention, according to a second point of view, relates to an apparatus for producing an object by means of additive manufacturing, comprising a process chamber for receiving a bath of material which can be solidified, a support for positioning the object in relation to the surface level of the bath of material, a solidifying device for solidifying a selective part of the material, and a recoating device which can be displaced along the surface of the bath for levelling the surface of the bath.

To reduce operational costs of the apparatus, it is an object to fully utilize the capacity of the apparatus and, at the same time, make sure that the total production lead time of a three dimensional object is minimized, i.e. the production queue is minimized.

One of the challenges in the manufacturing of three dimensional objects, in particular in additive manufacturing of metal objects, is how to accurately deposit the layer to be solidified. The thickness of the layer largely determines the accuracy with which the object can be produced. It is furthermore desirable that the layer of material is level, in particular that the surface of the material defines a (flat) plane. It is in this sense especially important that the layer of material, such as a liquid or a powder, is deposited in such a way that a relatively small, substantially level layer of material having a uniform layer thickness is obtained. Furthermore, all this should be reached in as little time as possible to improve the cost-effectiveness of the apparatus.

U.S. Pat. No. 5,582,876 A discloses an apparatus for additive manufacturing which comprises a process chamber for receiving a bath of liquid material which can be solidified, a movable support for positioning the object in relation to the surface level of the bath of liquid material; a laser for solidifying a selective part of the liquid material; and a wiper which can be displaced along the surface of the bath for levelling the surface of the bath of liquid material before the step of solidifying. The lower end of the wiper facing the surface of the bath is formed to flexibly yield in a direction opposite to the direction of displacement.

The accuracy and speed of the known apparatus, and in particular of the known wiper, do not satisfy the current additive manufacturing demands with respect to thickness, uniformness and speed of depositing and/or levelling the layer of material.

It is furthermore a drawback of the known apparatus, that the wiper is prone to damage by parts of the object to be produced protruding above the bath of material.

It is therefore an object of the invention to provide an apparatus for producing an object by means of additive manufacturing, which alleviates or reduces the drawbacks of the prior art, and in particular with which the recoating of the bath of material can be performed more effective, with decreased chance of damage to the wiper. More in particular, it is an object to provide an apparatus which achieves the levelling of the layer of material with at least one of more accuracy, increased uniformness, and increased speed.

To this end, the invention provides an apparatus for producing an object by means of additive manufacturing, comprising:
   a process chamber for receiving a bath of powdered material which can be solidified;
   a support for positioning the object in relation to the surface level of the bath of material;
   a solidifying device for solidifying a selective part of the material; and
   a recoating device which can be displaced along the surface of the bath for levelling the surface of the bath, wherein the recoating device comprises at least one elongated levelling member having a levelling element, wherein at least an end of the levelling element facing the surface of the bath is arranged to be displaceable in at least a direction substantially transversal to the plane defined by the surface (L) of the bath upon encountering a force exceeding a threshold.

The apparatus according to the invention comprises in particular a recoating device, such as a wiper, which can be displaced along the surface of the bath of powdered material for levelling the surface of the bath, wherein the recoating device comprises at least one elongated levelling member having a levelling element facing the surface of the bath. An end of the levelling element facing the surface of the bath is arranged to be displaceable in at least a direction substantially transversal to the plane defined by the surface of the bath upon encountering a force exceeding a threshold. The levelling element is thus arranged to move away from the surface of the bath of material, upon encountering a part of the object to be produced protruding from the surface of the bath of material, such that damage to the levelling element, and thus to the recoating device, is prevented. This makes the recoating device more durable, and thus a the layer of material may be recoated more accurately.

The threshold may be designed, based upon expected forces on the levelling element. In particular, during recoating the forces exerted on the levelling element are relatively small. When the levelling element hits a part of the object to be produced, the force is increased enormously. The force may then be increased by a factor 10, or even by a factor 100. It is possible to anticipate this, and to arrange the levelling element to move in at least a direction substantially transversal to the plane defined by the surface of the bath upon encountering a force exceeding a threshold. The threshold may be set at a desired level, for instance by designing the levelling element such that the levelling element moves upon encountering a specific force exceeding a threshold value.

Thus, with the recoating device having the levelling element as described above, the object of the invention is achieved.

Further advantageous embodiments of the present invention, from a second point of view, are described and some of these will be elucidated below.

In an embodiment, the levelling element is flexibly connected to the elongated levelling member for allowing the levelling element to be displaced in at least the direction transversal to the plane defined by the surface of the bath upon encountering the force exceeding the threshold. The flexible connection may be arranged by means of a spring element and/or damping element.

In an embodiment, the levelling element is designed to be flexibly deflectable in a direction counter to the displacing direction as well. Due to the flexible design, the risk of damage to the object is reduced, for instance when the levelling element hits a part of the object protruding above the level of the bath of material. The deflection in a direction counter to the displacing direction automatically ensures a movement in a direction transversal to the plane defined by the surface level of the bath. The levelling element is thus able to move past the object, without damage to the product and/or the levelling element.

In an embodiment, the levelling member has a plurality of levelling elements. By providing a plurality of levelling elements, each of which are flexibly deflectable in a direction counter to the displacing direction, it is possible to improve the uniformness of the surface level of the bath. Since a plurality of levelling elements are provided, each of which are individually flexibly deflectable, the recoating device is able to respond to local differences on the surface level, for instance due to protruding parts of the object to be produced which may urge a single levelling element to deflect, without affecting, or only minimally affecting, the other levelling elements of the levelling member. Thus, the influence of these disturbances on the uniformness of the material layer is limited to a relatively small region, whereas in the prior art, such a disturbance influences a relatively larger region. Thus, with the recoating device having a plurality of levelling elements, the object of the invention is achieved.

In an embodiment, the plurality of levelling elements are positioned side by side, as seen in the displacing direction. Thus, a comb like structure is obtained, wherein each of the levelling elements covers, during use, a different part of the layer of material. Thus, disturbances in the layer of material, due to protruding parts of the object, for instance, only affect a part of the plurality of levelling elements, and thus only a part of the levelling member is affected by these disturbances, instead of the complete levelling member.

In an embodiment, the plurality of levelling elements are at least partly positioned behind each other, as seen in the displacing direction. In this embodiment, the plurality of levelling elements are arranged for covering, during use, identical or similar parts of the layer of material. Thus, a single part of the layer of material is under the influence of at least two levelling elements during a single movement of the recoating device, thus improving the speed with which the layer of material may be levelled.

In an embodiment, an interspace is formed between the plurality of levelling elements of the elongated levelling member. This ensures that disturbances on a single levelling element do not, or only minimally, influence the other of the plurality of levelling elements.

In an embodiment, the recoating device comprises at least one further elongated levelling member. The further elongated levelling member is in an embodiment also arranged to be displaceable in at least a direction substantially transversal to the plane defined by the surface of the bath upon encountering a force exceeding a threshold. The further elongated levelling member may be arranged in such a way that the threshold for this further elongated levelling member is substantially equal to the threshold for the elongated levelling member.

The further elongated levelling member may have a plurality of further levelling elements that face the surface of the bath. These are in an embodiment designed to be flexibly deflectable in a direction counter to the displacing direction as well. In particular, the levelling elements and further elements are each positioned side by side, in their respective levelling member. The at least one further elongated levelling member may be positioned behind the levelling member, as seen in the displacing direction. In effect, two levelling members, each having a plurality of levelling elements positioned side by side, may be positioned behind each other, as seen in the direction of displacement. This improves both the speed and uniformity with which the layer of material may be deposited.

In an embodiment, at least part of the further levelling elements of the further levelling member are positioned in a staggered relationship with respect to the levelling elements of the at least one elongated levelling member. Thus, as seen in the direction of displacement, the further levelling elements are not positioned directly behind the levelling elements, but are shifted over a small distance. This ensures that disturbances, such as protruding parts of the object, hitting one of the levelling elements are less likely to hit further levelling elements positioned behind said one of the levelling elements. Furthermore, the further levelling elements positioned behind said one of the levelling elements may aid in levelling at least part of the layer of material influenced by the disturbance. Thus, the uniformity of the layer of material is increased.

In an embodiment, the at least one elongated levelling member has a plate-like shape. In particular, the levelling member is designed as a leaf-spring. Such a levelling member is relatively easy to produce, is relatively cheap and yields optimal results.

In an embodiment, the levelling member having the levelling elements is integrally formed. For instance, the levelling member may be formed from a single plate. This single plate may, in an embodiment, be tooled to form the plurality of levelling elements at one edge of the plate.

In an embodiment, the plurality of levelling elements are formed as teeth, extending from the elongated levelling member. This is relatively easy to produce, and provides for a relatively cheap design.

In an embodiment, at least part of the levelling members, in particular the plurality of levelling elements, comprise metal, or are made of metal, such as stainless steel. In an embodiment, the levelling member and levelling elements consist of metal. Metal is very durable. The risk of damage to individual levelling elements is minimized.

In an embodiment, wherein the levelling elements are substantially rectangular. In particular, this allows desired characteristics of the levelling elements, in particular the desired flexibility of the levelling elements, to be designed in a relatively easy manner.

In general, dimensions and characteristics of the levelling elements can be obtained using beam deflection formulae (or "vergeet-me-nietjes" in Dutch). These may be used to design the material and dimension of the levelling element, for a given threshold force. For deflection of a cantilever beam, having a concentrated load at the free end, this formula reads $f=F*L^3/(3*E*I)$; wherein E is the modulus of Elasticity or Young's modulus, L is the height of the levelling element and I is the area moment of inertia. This area moment of inertia, for a plate like levelling element having a rectangular cross section, reads $I=b*t^3/12$, wherein t is the thickness of the levelling element and b is the width of the levelling element. These formulae are in principle well known to those skilled in the art.

As an example, it is conceived that each levelling element should be able to take a force of 0.3 N. At this force, the levelling element should bend, in such a way that the levelling element is able to pass over the product in the bath of material. In the example, the levelling element is made of stainless steel. The Modulus of Elasticity (E-modulus) equals E=210 GPa. In this example, the levelling element has a length (l) of 10 mm, a width (b) of 2.2 mm and a thickness (t) of 0.1 mm. This yields an inertia of 183e−18 $m^4$. The corresponding deflection is 2.6 mm. The rise of the levelling element is in this case $10-(10^2-2.6^2)^{1/2}=0.35$ mm, wherein use is made of geometrics, here in particular an approximation using the Pythagorean theorem. It is to be understood that different calculation models, as well as different designs are conceivable, based on different desires relating to material, desired rise, desired force, etcetera.

In the following, example measurements are given, which are mainly based on the above design parameters, wherein use is made of levelling elements made of stainless steel.

The levelling elements may have a width, as seen in a direction transverse to the displacing direction, that ranges between 0.5 mm to 5.0 mm, in particular in between 1.0 mm and 3.0 mm, more in particular in between 1.5 mm and 2.5 mm, such as, for instance, 1.8 mm.

The levelling elements may have a height, as seen in a direction normal to the plane formed by the displacing direction and the width, that is equal to at least 2 times the width, in particular at least 4 times the width, more in particular at least 6 times the width.

The levelling elements may have a thickness, as seen in the displacing direction, that is equal to or less than 1/20 times the length, in particular 1/50 times the length, more in particular 1/100 times the length.

The interspace may have a width, as seen in a direction transverse to the displacing direction, that ranges between 0.0 mm to 1.6 mm, in particular in between 0.5 mm and 1.4 mm, more in particular in between 1.0 mm and 1.3 mm, such as, for instance, 1.2 mm. In particular, the width of the interspace may be substantially equal to the width of the levelling element.

The number of the plurality of levelling elements of the at least one elongated levelling member is, in an embodiment, at least 10. The number depends, amongst others, on the dimensions of the bath of material. The number may range in between 10 and 200, in particular between 50 and 150, and more in particular between 80 and 100. A higher number yields a more uniform layer of material, since it reduces the influence of parts of the object protruding above the surface level of the material. A higher number also leads to relatively higher costs for producing the recoating device. It has been found that a number in between 80 and 100 provides, in an embodiment, an optimum between accuracy and costs.

In an embodiment, the levelling elements in one levelling member substantially have an identical form. This is relatively easy to produce.

In an embodiment, the levelling elements of the further levelling member substantially have a different form than the levelling elements in the at least one levelling member. This design helps to improve the accuracy and uniformity of the levelling of the layer of material.

In an embodiment, an edge of the levelling elements facing the surface of the bath is rounded. This yields a further improvement in the accuracy and uniformity of the layer of material In an embodiment, the recoating device comprises a substantially rigid plowing member, positioned before the elongated levelling member. The plowing member is arranged to provide a first coarse step in levelling the layer of material, and then the elongated levelling member may be used to more precisely control the thickness and uniformity of the layer of material.

According to an aspect, the invention, from a second point of view, provides the use of the apparatus according to the invention.

According to an embodiment, the use comprises the levelling of a powdered layer of material.

From a third point of view, the invention relates to an apparatus for producing an object by means of additive manufacturing, comprising a process chamber for receiving a bath of material which can be solidified; a solidifying device for solidifying a selective part of the material; and a support structure being movable in a shaft for positioning the object in relation to the bath of material.

In a known apparatus, a bath of material is laid down on the movable support structure, and the laser is used to form a first layer of the object to be formed. Then the movable support structure is lowered by means of a spindle for a given distance, the bath of material is replenished, and the laser is used to form an additional layer on top of the first layer already formed.

To reduce operational costs of the apparatus, it is an object to fully utilize the capacity of the apparatus and, at the same time, make sure that the total production lead time of a three dimensional object is minimized, i.e. the production queue is minimized.

One of the challenges in the manufacturing of three dimensional objects, in particular in additive manufacturing of metal objects, is how to produce accurate and reproducible objects. The known apparatus does not satisfy the ever increasing additive manufacturing demands, in particular with accuracy and reproducibility of the objects produced.

It is therefore an object of the invention to provide an apparatus for producing an object by means of additive manufacturing with improved characteristics, in particular wherein an object may be produced with more accuracy and improved reproducibility.

To this end, the invention provides an apparatus for producing an object by means of additive manufacturing, comprising:
- a process chamber for receiving a bath of material which can be solidified;
- a solidifying device for solidifying a selective part of the material;
- a support structure being movable in a shaft for positioning the object in relation to the bath of material, wherein at least said support structure is provided with guiding means for guiding the support structure along the shaft during movement thereof.

The apparatus for producing an object by means of additive manufacturing according to the invention comprises a process chamber for receiving a bath of material which can be solidified; a solidifying device for solidifying a selective part of the material; and a support structure being movable in a shaft for positioning the object in relation to the bath of material. The accuracy and reproducibility of the apparatus is improved due to that at least said support structure is provided with guiding means for guiding the support structure along the shaft during movement thereof. The guiding means ensure that the movable support structure may be positioned more accurately, such that also the formation of layers during forming of the product may be performed with more accuracy. Ultimately, this makes it possible to produce objects with more reproducible results. With this, the object of the invention is achieved.

The guiding means are in an embodiment in contact with the shaft. In some embodiments, an interspace may be formed between the guiding means and the shaft, i.e. the guiding means are free from contact with the shaft.

The guiding means may comprise at least one of an air bearing, magnetic bearing, hydrostatic bearing, dynamical bearing, a sliding block, and/or a wheel element.

In an embodiment, the guiding means comprises at least one wheel element connected to the support structure, and displaceable along a first wall of the shaft. A wheel element provides for a relatively cost-effective guiding means. The at least one wheel element may be connected to the movable support structure, such that the wheel element may roll along the first wall of the shaft. It should be noted that the term first wall of the shaft also includes elements directly and fixedly connected thereto. For instance, the first wall of the shaft may be provided with a guide bar or guiding profile, and the wheel element may be in contact with the guide bar or the guiding profile. This is to be understood that the wheel element is displaceable along a first wall of the shaft.

In an embodiment, the support structure comprises a suspension element for the wheel element. The suspension may be a rigid suspension structure that connects the wheel element to the support structure. This aids in compensating for tolerances, such as for instance due to thermal expansion, or may improve the accuracy of the guiding means in general. However, a more flexible connection, is also conceivable, as will be explained below.

In an embodiment, the suspension element is movably, in particular pivotally connected to the support structure. This allows the support structure to better follow the wall of the shaft, and thus increases the ease and accuracy with which the support structure may be moved.

In an embodiment, the guiding means comprise at least one further wheel element connected to the support structure. In particular, the further wheel element may be displaceable along the first wall of the shaft.

In an embodiment, the at least one further wheel element is displaceable along a second wall of the shaft. The second wall differs from the first wall. By providing further wheel elements, displaceable along the first or the second wall, the accuracy of the positioning of the support structure is improved, since it reduces the degrees of freedom of the movable platform.

The further wheel element may be embodied, without limitation, as described above with respect to the wheel element. This includes the possibility of providing a further suspension element, including a further suspension element that is pivotally connected to the support structure, as well as the positioning of said further wheel element onto the same structural components as the first wheel element.

In an embodiment, the apparatus comprises a further suspension element for the at least one further wheel element, said further suspension element being movably, in particular pivotally connected to the support structure, and wherein the suspension element and the further suspension element are movably coupled to each other by means of a coupling element. A coupling element is provided, which is attached to both the suspension element and the further suspension element. This means that movement of the first suspension element leads to movement of the further suspension element, via the coupling element. This allows for a more smooth and accurate guiding of the support structure along the shaft.

In an embodiment, the coupling element comprises a spring and/or damping member. This provides for a relatively cost-effective coupling member. In addition the spring and/or damping member also ensures that the wheel element and the further wheel element are biased or urged to their respective wall of the shaft, such that smooth and accurate displacement along the shaft is possible.

In an embodiment, the suspension element and the further suspension element are interlinked to be pivotably movable in opposite directions. This ensures that the support platform itself is positioned centrally between the first wall and the second wall. In particular, when the first wall of the shaft is opposed to the second wall, it allows for a more accurate positioning of the support platform in between the first and second wall, since production tolerances of the shaft are levelled out by the guiding mechanism described above.

From a fourth point of view, the present invention relates to an apparatus for producing an object by means of additive manufacturing, comprising a process chamber for receiving a bath of material which can be solidified, a support for positioning the object in relation to the surface level of the bath of material, a solidifying device for solidifying a selective part of the material, and a recoating device which can be displaced along the surface of the bath for levelling the surface of the bath.

To reduce operational costs of the apparatus, it is an object to fully utilize the capacity of the apparatus and, at the same time, make sure that the total production lead time of a three dimensional object is minimized, i.e. the production queue is minimized.

Many different types of apparatuses are available nowadays, ranging from apparatuses capable of producing just a few objects in a day to apparatuses which are specifically tailored to perform mass production of objects. These apparatuses may further be distinguished in their size, some apparatuses are capable of producing objects having a relatively small size and other apparatuses are able to produce objects of a large size. Further, some objects which have been produced may require additional steps before the object is finalized, such as a heat treatment to relieve stresses built up in the produced object or a polishing process to further polish the produced object.

One of the challenges in the manufacturing of three dimensional objects, in particular in additive manufacturing of metal objects, is to provide for an apparatus which is suitable for any of the above mentioned purposes. For example, an apparatus capable of producing small and relatively large sized objects, whether in bulk or just a few samples thereof.

It is therefore an object of the invention to provide for a versatile apparatus for producing an object by means of additive manufacturing.

To this end, the invention, according to the fourth point of view, provides, in a first aspect thereof, in a modular additive manufacturing system for producing an object by means of additive manufacturing, said modular system comprising a control module arranged for controlling said system, and a plurality of adjacently positioned, interconnecting modules, said interconnecting modules comprising:
  at least one additive manufacturing module, comprising:
    a process chamber for receiving a bath of material which can be solidified;
    a solidifying device for solidifying a selective part of the material for producing said object;
  and at least one of:
    an exchange module arranged for exchanging said produced object,
    a heat treatment module arranged for providing a thermal process to relieve stresses built up in produced objects, and
    a storage module arranged for storing produced objects.

The invention is characterized in that each of said interconnecting modules comprise separate, mutually interconnecting guiding elements, said interconnecting guiding elements forming a single guiding rail, wherein said modular system further comprises a handling robot for transporting objects between said interconnecting modules over said single guiding rail.

It was the insight of the inventors that, in order to obtain a versatile apparatus for producing an object by means of additive manufacturing, a modular system may be provided, wherein the modular system may comprise a plurality of suitable modules adjacently positioned and connected to each other. The advantage hereof is that the system may be build up with different types of modules resulting in a system which is tailored to the needs of the customer. For example, a plurality of additive manufacturing modules may be used within a system in case the system should be suitable for mass production.

Another advantage of the present invention is that the system may be expanded, i.e. upgraded, over time with more modules. In case the need for producing objects changes over time, it may be decided to replace existing modules with other modules more suitable to meet that need.

According to the present invention, the modular additive manufacturing system is a single apparatus which is construed using a plurality of modules. As such, the system is a closed system, meaning that it is not possible for a person and/or operator to easily access the object which is being produced by the system.

The main aspect of the modular additive manufacturing system according to the present invention is the additive manufacturing module which comprises
  a process chamber for receiving a bath of material which can be solidified;
  a solidifying device for solidifying a selective part of the material for producing said object.

The inventors found that the flexibility and the employability of such a module is improved in case other types of modules can easily be connected to that module.

After the solidifying device has solidified the bath of material in the process chamber, an object is produced. The inventors found that, depending on the requirements for the produced object, additional process steps may be performed on the produced object. These additional process steps are to be performed in a closed system, i.e. without the object leaving the system, as in such a case environment can not be controlled. A controlled environment is necessary to make sure that the requirements for the produced object are met. The inventors noted that, in order to provide for a modular system as described above, each of the modules is to be equipped with interconnecting guiding elements, such that, when connected, the interconnecting guiding element form a single guiding rail over which the handling robot is able to be moved. In such a case, it is not necessary to provide for a new guiding rail each time a module is replaced.

According to the present invention, the handling robot is able to move over the single guiding rail. The exact movement of the robot may be controlled by the control module. As such, a data connection between the control module and the handling robot is to be provided. The data connection may, for example, be comprised by a cable connected to the handling robot and to the control module. In another example, the data connection is provided by data lines provided in, or provided by the single guiding rail. A single guiding rail in the form a railroad track is, for example, suitable as a means for guiding the handling robot between the different interconnecting modules and, at the same time, provide for data exchange between the handling robot and the control module for controlling the handling robot.

The handling robot may also require power for driving itself over the single guiding rail. According to the invention, the power may be provided by the control module, again over separate cables between the handling robot and the control module, or incorporated in the singe guiding rail.

According to the present invention, the exchange module is arranged for exchanging the produced object. This means that the produced object may be safely taken from the module, by, for example, a person, such that the object can be transported to its destination. As such, the exchange module may be regarded as a temporary storage location wherein produced objects are to be stored before they are processed by a shipping service, or the like.

Instead of replacing modules present in the system, it may also be decided to add new modules such as
  at least one heat treatment module arranged for providing a thermal process to relieve stresses built up in produced objects, or
  at least one storage module arranged for storing produced objects.

In an example, an order of said modules is said control module, followed by said at least one additive manufacturing module, followed by a remainder of said interconnecting modules, and ending with said exchange module.

The inventors noted that, in order to gain efficiency in producing the objects, the at least one additive manufacturing modules should be placed adjacently to each other. This is especially beneficially in situations wherein the control module further provides for utilities like cooling, gas provisioning, etc., such that these utilities do not need to be distributed over all the modules of the system. These utilities are, for example, only required by the additive manufacturing modules such that these modules are placed adjacently to each other.

In another example, a first side of an interconnecting module is connected to a second side of another interconnecting module, wherein the interconnecting guiding elements of said interconnecting modules extend between said first side and said second side of said interconnecting modules.

The guiding elements may also be extendable in towards the first side and the second side of the interconnecting module such that the guiding elements may be connected to each other once the modules are already placed adjacently to each other.

In a further example, said interconnecting guiding elements comprise mutually complementing shapes at said first and second side of their interconnecting modules, respectively, thereby resulting in a mating connection between said interconnecting modules.

In yet another example, the interconnecting guiding elements are mounted to a back side of said interconnecting modules.

In a further example, the interconnecting modules are connected to each other such that said modular system is dust tight.

In an example, the control module is arranged for providing utilities comprising at least one of gas, power supply, cooling, data communication, to said interconnecting modules.

Here, each of said interconnecting guiding elements may comprise interconnecting distributing elements, said distributing elements forming a single distributing rail, wherein said utilities are being distributed over said modular system using said distributing rail.

The interconnecting distributing elements may further be arranged for data communication, and wherein each of the interconnecting modules comprise an electronic identification, and wherein said interconnecting modules are arranged for communicating said electronic identifications over said distributing elements to said control module for indicating a type of module and an order of adjacent positioned interconnecting modules, wherein said control module is arranged for controlling said handling robot based on said received identifications.

In another example, each module may be arranged with detection means for detecting the presence of the handling robot at its corresponding interconnecting guiding element. The detection means may be arranged, for example, as an optical gate, wherein an optical path of the gate is being interrupted every time the handling robot passes the detection means.

The mechanical location of the detection means at each of the modules may be used, by the control module, to control the handling robot. For example, the control module may use this information to calibrate the position of the handling robot at the single guiding rail.

One of the advantageous hereof is that adding or replacing modules have the beneficial effect that the control module does not need to be updated. The control module is able to use the information of the detection means to calibrate and/or control the handling robot over the single guiding rail.

The expressions, i.e. the wording, of the different aspects comprised by the system according to the present invention should not be taken literally. The wording of the aspects is merely chosen to accurately express the rationale behind the actual function of the aspects.

In accordance with the present invention, different aspects applicable to the above mentioned examples of the system, including the advantages thereof, correspond to the aspects which are applicable to the interconnecting module, according to the present invention.

The invention, according to the fourth point of view, provides, in a second aspect thereof, in an interconnecting module arranged for operation in a modular system for producing an object by means of additive manufacturing according to fourth point of view, said interconnecting module being any of:

an additive manufacturing module, comprising:
a process chamber for receiving a bath of material which can be solidified;
a solidifying device for solidifying a selective part of the material for producing said object;
an exchange module arranged for exchanging said produced object,
said interconnecting modules further comprise:
a heat treatment module arranged for providing a thermal process to relieve stresses built up in produced objects.
a storage module arranged for storing produced objects.
said interconnecting module comprises separate, mutually interconnecting guiding elements such that said interconnecting module may be connected to a further interconnecting module, where said interconnecting guiding elements forming a single guiding rail when said modules are connected such that a handling robot is able to transport objects between said interconnecting modules, when connected, over said single guiding rail.

The above-mentioned and other features and advantages of the invention will be best understood from the following description referring to the attached drawings. In the drawings, like reference numerals denote identical parts or parts performing an identical or comparable function or operation.

From a fifth point of view, the invention relates to an apparatus for producing an object by means of additive manufacturing, comprising a process chamber for receiving a bath of material which can be solidified, wherein a surface level of the bath of material defines an object working area; a support for positioning the object in relation to the surface level of the bath of material; and a plurality of solidifying devices, each arranged for solidifying a selective part of the material.

To reduce operational costs of the apparatus, it is an object to fully utilize the capacity of the apparatus and, at the same time, make sure that the total production lead time of a three dimensional object is minimized, i.e. the production queue is minimized.

It is an object of the invention to provide an apparatus for producing an object by means of additive manufacturing, with which an object may be more quickly produced, in a cost effective way.

To this end, the invention provides an apparatus for producing an object by means of additive manufacturing, comprising:
a process chamber for receiving a bath of material which can be solidified, wherein a surface level of the bath of material defines an object working area;

a support for positioning the object in relation to the surface level of the bath of material;

a plurality of solidifying devices, each arranged for solidifying a selective part of the material, wherein each of the plurality of solidifying devices is arranged for being able to operate in at least substantially the entire object working area; and control means arranged for individually controlling the plurality of solidifying devices, wherein the control means are at least arranged for simultaneously operating the plurality of solidifying devices in different parts of the object working area.

According to the invention the apparatus comprises a plurality of solidifying devices, wherein each of the plurality of solidifying devices is arranged for being able to operate in substantially the entire object working area; as well as control means arranged for controlling the plurality of solidifying devices, wherein the control means are arranged for simultaneously operating the plurality of solidifying devices in different parts of the object working area. With this, the plurality of solidifying devices may be controlled to work in substantially the entire object working area, such as for instance, at least 80%, preferably at least 90% of the object working area, such that it is possible to solidify different parts of a single object, in the same process chamber, at the same time. By simultaneously solidifying different parts of a single object, this object may be produced more quickly, and total production time of the object may be decreased. In particular, this means that with the apparatus according to the invention a larger number of objects may be produced in a given time unit, compared to devices known from the prior art. With this, the object of the invention is achieved.

In an embodiment, the plurality of solidifying devices are arranged for emitting electromagnetic radiation. In an embodiment, the type of electromagnetic radiation emitted by the plurality of solidifying devices may be the same for each and every solidifying device. However, it is conceivable, in an embodiment, that the type of electromagnetic radiation emitted by the plurality of solidifying devices differs for at least two of the plurality of solidifying devices.

In an embodiment, the apparatus comprises a plurality of deflector means arranged for deflecting electromagnetic radiation emitted by each of the plurality of solidifying devices. Said deflector means are known per se, but the use of a plurality of such deflector means allows simultaneous solidifying of the layer of material for quicker production times, as well as for a compact construction of the apparatus.

In an embodiment, the plurality of deflector means are positioned near a line perpendicular to the plane defined by the object working area, and which line passes through geometrical centre of gravity of the object working area. In other words, the deflector means are substantially provided above a centre part of the object working area. This allows each of the plurality of solidifying devices to be able to reach substantially the entire object working area, such that, for instance, simultaneous solidifying of different parts of a single object may occur.

In an embodiment, the apparatus comprises a total number of four solidifying devices. A total number of four devices provides for improved speed of manufacturing, whilst being able to keep a compact design of the apparatus, and whilst keeping total costs of the apparatus under control. Likewise, a total number of four deflector means may be provided. The four solidifying devices and four deflector means may be arranged in a geometrical pattern.

According to an aspect, the invention according to the fifth view provides a method for producing an object by means additive manufacturing, in particular using an apparatus as described above. The method comprises the steps of providing a bath of material which can be solidified, wherein a surface level of the bath of material defines an object working area. According to the invention, the method comprises the step of simultaneously operating a plurality of solidifying devices in substantially the entire object working area for simultaneously solidifying different parts of the product to be produced. In other words, the capacity of the plurality of solidifying devices is combined to produce a single product.

It is noted that the advantages of the invention are also achieved when the plurality of solidifying devices are used for producing several products. It is conceivable that each solidifying device is used for producing a respective of a plurality of products. However, the plurality of solidifying devices may be used, according to the method of the invention, for producing different parts of a single product to be produced, at a given moment. This speeds up the time with which this product, or layer of the product, may be produced.

In an embodiment, the method comprises the step of solidifying a contour of the object to be produced with one of the plurality of solidifying devices, and simultaneously solidifying an internal part of the object to be produced with a further of the plurality of solidifying devices.

In an embodiment, the method comprises the step of solidifying parts of the object working area by means of electromagnetic radiation.

In another embodiment, a first of the plurality of solidifying devices is used as a preheat device, and a second of the plurality of solidifying devices is used to solidify the preheated part of the material which can be solidified.

The plurality of solidifying devices may be similar solidifying devices, or different solidifying devices. For instance, the power provided by the solidifying devices may be mutually different.

It will be apparent to those skilled in the art that the control unit is arranged for individually controlling the plurality of solidifying devices, such that it is possible that only one of the solidifying devices is active, and the remaining of said solidifying devices is inactive.

It is noted that it is very advantageous to combine the invention according to the first point of view with the invention according to the fifth point of view. In particular, this means that an registering device may be provided in the form of an imaging device for each solidifying device. Then, a calibration routine, as described for the first point of view for a single solidifying device, may be performed for each of the available solidifying devices. This ensures that the plurality of different solidifying devices may work together in an accurate way.

In a sixth point of view, the invention relates to an apparatus for producing an object by means of additive manufacturing, comprising a process chamber for receiving a bath of material which can be solidified by exposure to electromagnetic radiation; a support for positioning the object in relation to the surface level of the bath of material; and a solidifying device for solidifying a layer of the material on the surface level by means of electromagnetic radiation.

One of the disadvantages of these apparatuses is their limited capacity in producing the three dimensional objects as well as their limited capability in flexibility for producing the objects.

As such, one of the challenges in the manufacturing of three dimensional objects using a computer controlled additive manufacturing apparatus is to fully utilize the capacity of the apparatus.

It is an object to provide for an system for managing production of objects by means of additive manufacturing, which system is arranged for providing the possibility to manage a plurality of apparatuses for producing said objects by means of additive manufacturing.

It is another object to provide for an apparatus for producing an object by means of additive manufacturing, which apparatus is suitable for operation in said system.

In a first aspect of the invention, according to the sixth point of view, there is provided a system for managing production of objects by means of additive manufacturing, said system connected to, or comprising, a plurality of apparatuses for producing an object by means of additive manufacturing, each of said apparatuses comprising:
- a process chamber for receiving a bath of material which can be solidified,
- a solidifying device for solidifying a selective part of the material for producing said object, and
- a control device for controlling said apparatus for producing said object based on a print job,
- interface means arranged for receiving said print job over a public network;
- wherein each of said plurality of apparatuses are connected to each other via said public network, and wherein said system comprises a central server arranged for determining geographical location information of said plurality of apparatuses, for acquiring a print job, for selecting at least one of said plurality of apparatuses based on said geographical location information of said apparatuses and for transmitting said print job to said selected apparatus.

It was the insight of the inventors that the digital processes, i.e. the generation of the designs for the objects to be produced as well as the corresponding print jobs, can be decoupled from the actual physical processes, i.e. the production of the object by an apparatus based on a print job. The system according to the present invention supports such a subdivision of processes as each of the apparatuses are connected to each other via the public network.

The improved system according to the present invention is based on the concept that the total capacity for producing objects is increased by connecting multiple apparatuses to each other thereby creating a cluster of apparatuses, each of which may be, at least partly, controlled by the central server. As such, a distributed manufacturing system is provided.

The inventors found that the decision to which apparatus a print job is to be sent should at least be based on the geographical location information of the apparatuses.

The geographical location information may be any of Global Positioning System, GPS, coordinates, country, city, area code, postal code, Internet Protocol, IP, address ranges, static sales information, or the like. The geographical location information of the apparatuses may be considered static information, for example pre-stored in a database of the central server, or may be regarded as more dynamic information such that an apparatus needs to inform the central server about its geographical location information.

The apparatus may then be arranged to transmit its geographical location information periodically, for example yearly, monthly, or the like, or may transmit its geographical location information only once a change of location has been detected by the apparatus.

One of the advantages of the system is that the total production lead time of objects, i.e. three dimensional objects, may be minimized in case apparatuses combine forces, i.e. work together. The inventors noted that it may be more efficient to distribute the total amount of objects to be produced, or print jobs, over each of the available apparatuses such that more capacity is obtained for producing these objects.

In accordance with the present invention, the total amount of objects, or print jobs, to be produced by the system may be evenly distributed among all of the apparatuses, or among a subset of the plurality of apparatuses. In an alternative, each object, or print job, to be produced may be provided with a priority status. The priority statuses of each object or print job may then be used, by the central server, as an further input for selecting one of the plurality of apparatuses.

In the context of the present invention, the material used may be any type of material suitable for additive manufacturing such as, but not limited to liquid, powder, paper or sheet material like stainless steels or other types of alloys.

According to the present invention, different physical sizes of apparatuses may exist, for example having a relatively small process chamber suitable for producing three dimensional objects having a size comparable to a pen, telephone, cup, etc, or having a relatively large process chamber suitable for producing three dimensional objects having a size comparable to a desk, chair, or even larger. In case the central server, according to the present invention, is faced with multiple three dimensional objects, or multiple print jobs, ranging from a relatively small size to a relatively large size, the central server may decide to further select apparatuses based on their specific capability.

According to the invention, the central server is arranged for acquiring a print job. The print job may, for example, be received by the central server, from an engineer or designer, via the public network. The print job may also be located in a print queue designated in the central server.

In an example, the server comprises a database, wherein said database comprises identifications and corresponding geographical location information of each of said plurality of apparatuses.

One of the advantages hereof is that the security of the database is under control of the system itself.

In another example, the plurality of apparatuses are connected to each other via said central server.

The plurality of apparatuses may have a direct connection to the central server comprised by the system, for example for exchanging process data or the like. However, according to the present invention, it is not necessary for the plurality of apparatuses to directly communicate, or exchange data, to each other over the public network.

In an example, the server is arranged for receiving process information from any of the apparatuses, the process information being any of a type of material said apparatuses are able to process, object size said apparatuses are able to produce, capability of said apparatuses for producing objects, accuracy of objects, speed at which objects are produced, material properties for objects to be produces, detail size of objects to be produced, and wherein said server is further arranged for selecting said at least one of said plurality of apparatuses based on said process information.

Selecting the at least one of the plurality of apparatuses may then further be based on the available process information for each of the apparatuses. For example, a print job requiring a certain type of material, and a certain size of process chamber, needs to be sent to an apparatus capable of processing such a print job.

In a further example, the apparatuses are connected to said server via a private network across said public network.

The advantage hereof is that it enables an apparatus to receive and/or send data across said public network as if it was directly connected to the private network, while benefiting from the functionality, security and management policies of the private network. For example, A Virtual Private Network, VPN, is created by establishing a virtual point-to-point connection through the use of dedicated connections, virtual tunneling protocols, or traffic encryptions.

In an example, the print job comprises geographical location information to which an object is to be shipped, and wherein said selecting at least one of said plurality of apparatuses comprises:

selecting at least one of said plurality of apparatuses having geographical location information in a geographical proximity of said geographical location information to which said object is to be shipped.

The inventors found that it may be advantageous if the production location of the object, i.e. location of the selected apparatus, and the geographical location information whereto the object is to be shipped, are matched to each other. For example, it may be advantageous to produce an object in case the object is to be shipped to the Netherlands, as this reduces the transport time, as well as the corresponding transportation costs, required for transporting a produced object. As such, an apparatus is selected which is geographically oriented closely to the destination location of the object to be produced.

The central server may further be arranged to select an apparatus from said plurality of apparatuses based on costs and/or carbon footprint of the object to be produced.

In a further example, the central server comprises occupancy information of each of said plurality of apparatuses, and wherein said selecting at least one of said plurality of apparatuses comprises:

selecting at least one of said plurality of apparatuses based on said occupancy information.

The advantage hereof is that print jobs may be distributed over the available plurality of apparatuses such that the total amount of work load for producing the objects is also distributed among these apparatuses. Besides taking into account the geographical location information of the apparatuses, the central server may select apparatuses for the print jobs such that the print jobs are evenly distributed over the apparatuses.

In an example, the object comprises a plurality of print jobs, and wherein said server is arranged for selecting at least one of said apparatuses for transmitting at least one of said plurality of print jobs such that a total production lead time of said object is minimized.

The inventors noted that in some cases a three dimensional object is comprised by a plurality of print jobs, i.e. a plurality of different parts to construe the three dimensional model. The total production lead time, i.e. the time required for producing the complete three dimensional object, may be reduced in case each of the parts are created by a different apparatus.

In a further example, at least one of said apparatuses is arranged for transmitting, to said central server, its geographical location information, for example periodically or on request by the central server.

The at least one of said apparatuses may further possess a network address, and the at least one of said apparatuses may be arranged for determining its geographical location information by deducing said geographical location information from said network address.

In an example, the central server is arranged for storing process information for said print jobs. The process information may be any of design, process settings, layer deposition strategy, simulation data, production data, measurement data, or the like. The central server may store such a data in its secure database. The process information may also be transmitted to the apparatuses along with corresponding print jobs.

In a further example, the public network is the internet.

In another example, a print job comprises at least one of a print model of an object, one or more series of subsequent layers of said object, apparatus settings and vectors for said object, wherein said apparatus settings may comprise any of type of material, temperature settings, accuracy settings.

In a second aspect of the invention, according to the sixth point of view, there is provided an apparatus for producing an object by means of additive manufacturing, said apparatus suitable to be used in a system according to the sixth point of view as described above, wherein said apparatus comprises:

a process chamber for receiving a bath of material which can be solidified, a solidifying device for solidifying a selective part of the material for producing said object, and a control device for controlling said apparatus for producing said object based on a print job, interface means arranged for receiving said print job over a public network.

The expressions, i.e. the wording, of the different aspects comprised by the apparatus according to the present invention should not be taken literally. The wording of the aspects is merely chosen to accurately express the rationale behind the actual function of the aspects.

In accordance with the present invention, different aspects applicable to the above mentioned examples of the system, including the advantages thereof, correspond to the aspects which are applicable to the apparatus, according to the present invention.

The above-mentioned and other features and advantages of the invention will be best understood from the following description referring to the attached drawings. In the drawings, like reference numerals denote identical parts or parts performing an identical or comparable function or operation.

The invention is not limited to the particular examples disclosed below in connection with a particular type of computer controlled additive manufacturing apparatus.

In a seventh point of view, the present invention relates to an apparatus for producing an object by means of additive manufacturing, comprising a process chamber for receiving a bath of material which can be solidified; a structure for positioning the object in relation to the surface level of the bath of material; a solidifying device for solidifying a layer of the material on the surface; and an extraction device fluidly connected to the process chamber and arranged for extracting material out of the process chamber.

To reduce operational costs of the apparatus, it is an object to fully utilize the capacity of the apparatus and, at the same time, make sure that the total production lead time of a three dimensional object is minimized, i.e. the production queue is minimized.

One of the challenges in the manufacturing of three dimensional objects, in particular in additive manufacturing of metal objects, is related to the deposition of the layer to be solidified. According to prior art practice, powdered layer of material is removed from the process chamber by means of a suction device after having solidified selective parts of said layer of material. Then, a new bath of material to be solidified is deposited in the process chamber. Removing of powder takes a lot of time, and is relatively difficult when complex objects are being produced.

The accuracy and speed of production of the known apparatus, and in particular of the powder extraction, do not satisfy the current additive manufacturing demands.

It is therefore an object of the invention to provide an apparatus for producing an object by means of additive manufacturing, with which improved speed and accuracy of manufacturing may be obtained, and in particular wherein the powder extraction can be performed with increased speed and increased effectivity.

Thereto, the invention provides an apparatus for producing an object by means of additive manufacturing, comprising:
- a process chamber for receiving a bath of powdered material which can be solidified;
- a structure for positioning the object in relation to the surface level of the bath of material;
- a solidifying device for solidifying a layer of the material on the surface;
- an extraction device fluidly connected to the process chamber and arranged for extracting material out of the process chamber; and
- blowing means for inducing a gaseous flow in the process chamber affecting the material to be extracted, wherein said blowing means comprise a plurality of blow nozzles fluidly connected to the process chamber and directed in a plurality of different directions.

The apparatus comprises, a process chamber for receiving a bath of material which can be solidified, in particular a bath of powdered material that can be solidified in order to make metal products. A structure is provided for positioning the object in relation to the surface level of the bath of material. A solidifying device, such as a laser device, for solidifying a layer of the material on the surface, in particular by means of electromagnetic radiation, is provided. To remove powder of the bath of material, for example after having solidified selective parts of the layer of material, an extraction device is provided which is fluidly connected to the process chamber and arranged for extracting material out of the process chamber. According to the invention, the apparatus comprises blowing means for inducing a gaseous flow in the process chamber effecting the material to be extracted. By using a gaseous flow in the process chamber, the material to be extracted is affected and blown around in the process chamber, and the possibility of the extraction device being able to extract said material is increased.

To further improve the possibility of extraction of material from the process chamber, said blowing means comprise a plurality of blow nozzles fluidly connected to the process chamber and directed in a plurality of different directions. By providing a plurality of nozzles, having a plurality of different directions, it is possible to induce a flow over the support structure which is able to better reach the various parts of the support structure. This way, the coverage of the blowing means is improved, such that an improved part of material in the process chamber is subjected to the gaseous flow, and is picked up by this gaseous flow, such that extraction of material is improved, both in speed and in amount. The use of a plurality of nozzles having a plurality of directions decreases the chance of formation of so called "lee" sides behind the object being produced, said "lee" sides being parts of the bath of material where the object to be produced provides a shelter from the gaseous flow. Thus, the apparatus according to the invention is able to extract more material in less time, and thus the goal of the invention is achieved.

In an embodiment, at least one of the plurality of blow nozzles is a movable nozzle. The apparatus may be arranged, for instance by means of drive means connected to a control unit, for moving the movable nozzle during blowing of the blowing means, such that the flow induced in the process chamber is subject to changes in directions. This means that the nozzle is able to reach a bigger part of the process area, such that more material to be solidified is affected by the flow induced. Thus, material extraction, in particular powder extraction, may be improved by using one or more movable nozzles. In particular, the plurality of nozzles may be movable nozzles, or a combination of stationary nozzles and movable nozzles may be used.

In an embodiment, the at least one movable nozzle is arranged to be moved by the flow discharged by said movable nozzle. Rather than being moved by drive means and a control unit, it is possible to arrange the nozzle in such a way that the nozzle is moved by the forces exerted by the flow discharged by said nozzle. For instance, the nozzle end may be arranged in the form of a flexible hose or tube being provided with a freely movable end. In such an embodiment, flow discharged through the nozzle will automatically lead to movement of the freely movable end of the flexible hose or tube, such that a movable nozzle is obtained. Advantageous of this embodiment is that it delivers a relatively randomized pattern of movement of the flow directions discharged by said movable nozzle. Furthermore, this embodiment is relatively cheap.

In an embodiment, the plurality of nozzles are arranged for inducing gaseous flows having different pressures. One of the nozzles may then be arranged for providing a flow having a relatively low pressure, and the other may be arranged for providing a flow having a relatively large pressure, which may be used to induce turbulences in the flow pattern.

In an embodiment, the plurality of nozzles are arranged for inducing gaseous flows having different volume flows. One of the nozzles may be arranged for inducing a gaseous flow having a relatively large volume flow, in particular that substantially corresponds to the volume flow being extracted by the extraction means. The other nozzle may then be arranged for inducing a relatively small flow, affecting a relatively small area of the process chamber. This, in particular in combination with the different pressures as described above, improves the amount of material extracted by the apparatus.

In an embodiment, the extraction device comprises an extraction tube connected to a pumping unit, wherein an inlet opening of the extraction tube is positioned within the process chamber. This allows for extraction of material from the process chamber.

In an embodiment, the extraction device is provided with a filter unit for filtering a flow of liquid or powdered material extracted from the process chamber. For instance, it is possible to filter particles from the gaseous flow, in order to collect particles, which may, for instance, be re-used again in solidifying a further layer. It is furthermore possible to filter and collect unwanted particles, for instance particles having a specific dimension, such as particles exceeding a certain dimension.

In an embodiment, the filter unit is a cyclone filter. A cyclone filter is a very effective filter for filtering flows containing solid particles, and collecting these solid particles. The cyclone filter is thus effective for filtering powder material to be solidified.

In an embodiment, the extraction device comprises a holder for holding material extracted from the process chamber. The holder may be used for permanently or temporarily storing the extracted material. The holder may be connected to a recoating device, which uses part or all of the extracted material for laying down a further layer of material to be solidified in the process chamber.

In an embodiment, the extraction device comprises an exhaust tube for exhausting a gas flow associated with the material extracted from the process chamber. This allows for the gas flow to be exhausted to the environment.

In an embodiment, the cyclone filter is connected to the holder and the exhaust tube, for collecting material in the holder, and venting the gas through the exhaust tube. As indicated above, this allows the gas with material to be passed through the cyclone filter, in such a way that the particle material is collected and the gas is exhausted through the exhaust tube.

According to an aspect, the invention provides a method of using an apparatus according to the invention, in particular a method for extracting material out of the process chamber of said device, wherein the method comprises the step of inducing a gaseous flow in the process chamber for effecting the material to be extracted. According to the invention, the plurality of blow nozzles are used for inducing a plurality of jets that are directed in a plurality of different directions. The advantages of such a method and/or usage have already been described above with respect to the apparatus.

BRIEF DESCRIPTION OF THE DRAWINGS

Embodiments of the invention will be described in the following in connection with the Figures. In the Figures

Embodiments of the invention, from a second point of view, will be described in the following in connection with the Figures. In the Figures

FIG. 6a-6c are a front view, and side views of a first embodiment of the levelling member according to the present invention from a second point of view.

DETAILED DESCRIPTION

Figure 1:
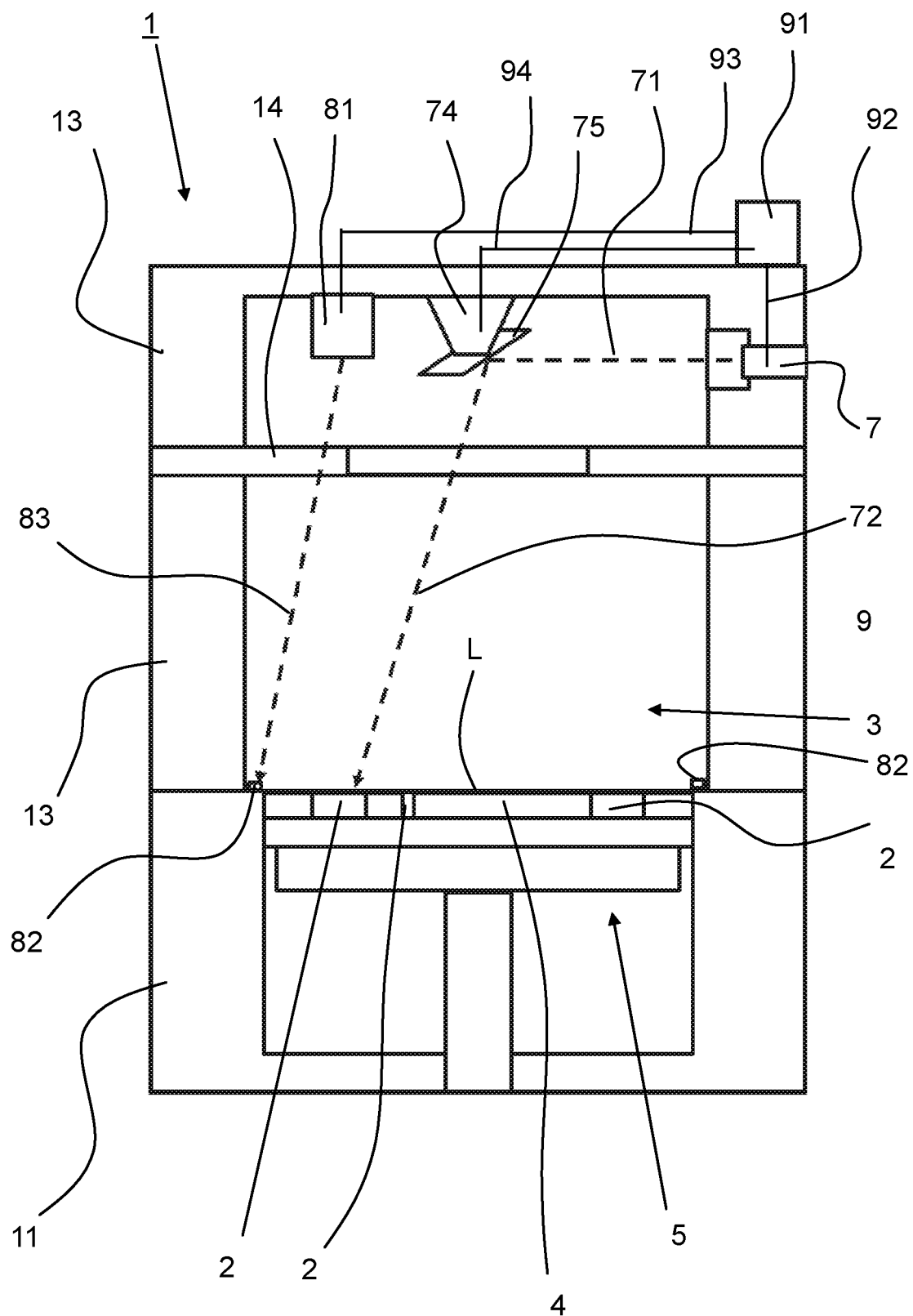
FIG. 1 is an overview of an apparatus according to a first embodiment of the present invention, for additive manufacturing an object.

FIG. 1 shows an overview of an apparatus 1 for producing an object 2 by means of additive manufacturing, according to a first embodiment of the invention. The apparatus 1 is build from several frame parts 11, 13. The apparatus comprises a process chamber 3 for receiving a bath of material 4 which can be solidified. In a lower frame part 11, a shaft is formed, wherein a support 5 is provided for positioning the object 2 in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material. In the embodiment shown, the solidifying device 7 is a laser device, which is arranged for producing electromagnetic radiation in the form of laser light, in order to melt a powdered material provided on the support, which then, after cooling forms a solidified part of the object to be produced. As can be seen, the electromagnetic radiation 71 emitted by the laser device 7 is deflected by means of a deflector unit 74, which uses a rotatable optical element 75 to direct the emitted radiation 71 towards the surface L of the layer of material 4. Depending on the position of the deflector unit 74, radiation may be emitted on different parts of the surface level L of the bath of material.

The top frame part 13 is provided with a support structure 14, extending mainly parallel to the plane formed by the surface level L of the bath of material 4. This support structure 14 provides strength to the top frame part.

The apparatus 1 according to the invention comprises a registering device 81, here in the form of an imaging device 81, for registering a characteristic related to the surface level L of the bath of material. The apparatus according to the invention further comprises a control unit 91 connected, by means of line 93, to the registering device 81 and arranged for using the characteristic obtained by the registering device for controlling the position of the electromagnetic radiation emitted by the solidifying device. To this end, the control unit 91 may be connected, by means of line 92, to the solidifying device, and/or to the deflector unit 74, by means of line 94.

As can be seen in FIG. 1, the registering device comprises at least one imaging device, in particular an optical imaging device, such as a camera unit 81. The camera unit is arranged for making one or more images of calibration elements 82 provided on or near the support 5, in the example shown connected to the lower frame part 11. The one or more images of one or more of the calibration elements 82 obtained by the registering device are processed by the registering device itself, or are fed to the control unit for being processed there. In particular, the processing step includes obtaining a geometric characteristic of the calibration element 82 registered by the registering device 81. This geometric characteristic may be used for controlling the solidifying device 7 or the deflector unit 74, in order to control the position of the electromagnetic radiation 72 emitted by the solidifying device 7.

As an alternative (not shown) to the embodiment shown in FIG. 1, the registering device 81 may be positioned on or near the support 5. For instance, the calibration element 82 shown in FIG. 1 may be substituted by a registering device 81, which is arranged for directly registering the electromagnetic radiation 72 emitted by the solidifying device 7. In this embodiment, the position of the registering device 81 is then directly related to the position of the surface level L of the bath of material. For calibrating the apparatus 1, the electromagnetic radiation 72 is then controlled in such a way as to reach the registering device 81. When the electromagnetic radiation 72 reaches the registering device 81 on or near the support 5, i.e. when the registering device 81 detects the electromagnetic radiation 72 emitted, then the actual position of the electromagnetic radiation (i.e. the position of the registering device) is known, as well as the target position of the electromagnetic radiation (i.e. the position intended to be reached). The actual position may be compared to the target position, and the difference may be used by the control unit 91 to calibrate the position of electromagnetic radiation emitted by the solidifying device 7 during solidifying selective parts of the surface level L of the bath. In particular, the use of a plurality of registering devices 81, for instance, but not limited to, a total of four or six devices 81, provided on different locations on or near the surface level L of the bath of material 4, may be used to improve the accuracy of the calibration.

Figure 2:
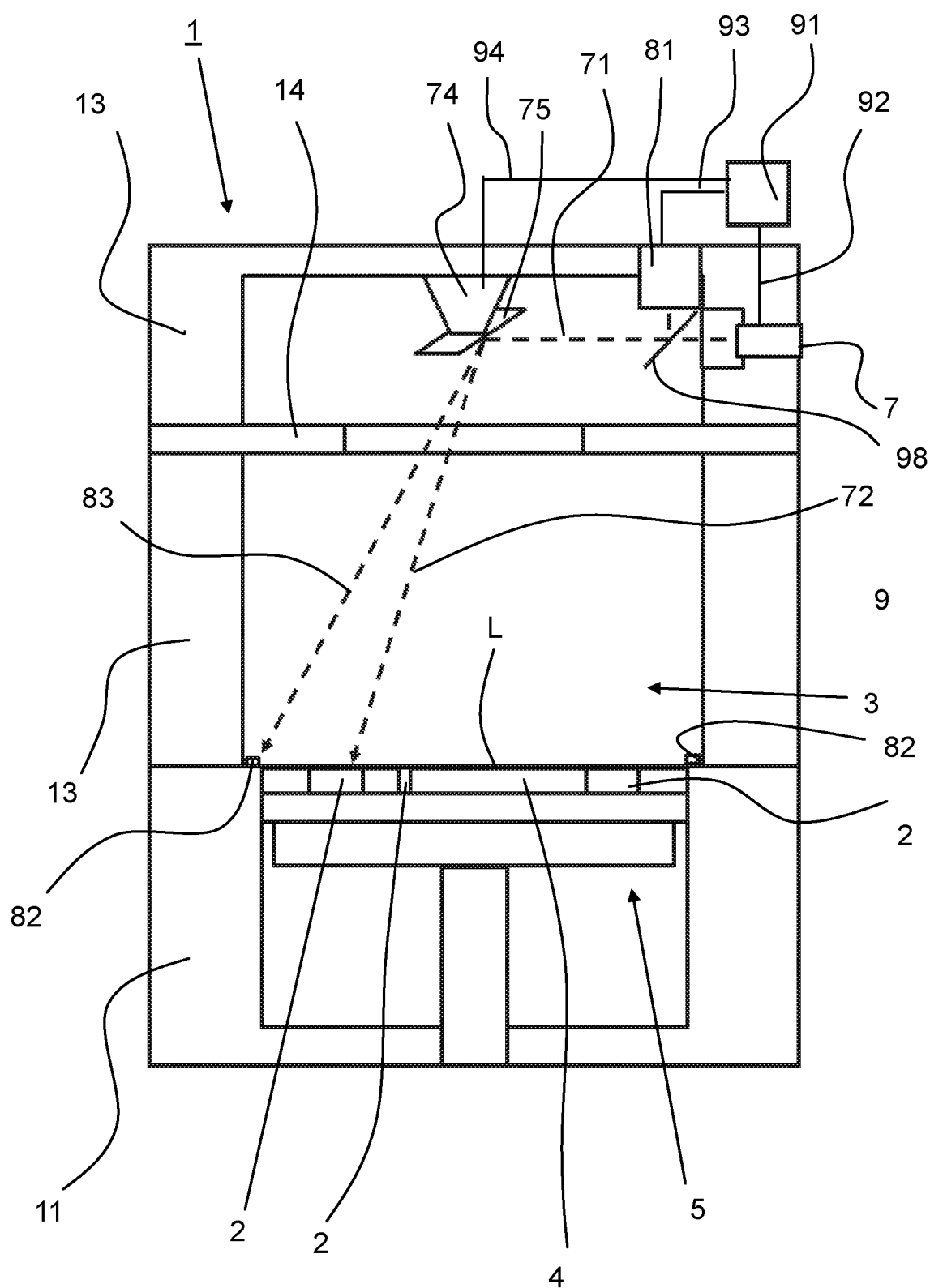
FIG. 2 is an overview of an apparatus according to a second embodiment of the present invention, for additive manufacturing an object.

FIG. 2 shows a second embodiment of the apparatus 1. Similar parts are indicated by the same reference numeral. The apparatus 1 largely corresponds to the apparatus as shown in FIG. 1, and for reasons of conciseness, mainly the differences will be described. As can be seen in FIG. 2, the main difference is that the position of the imaging device 81 differs with respect to the embodiment shown in FIG. 1. Here, the imaging device 81 is arranged such that an optical path 71 of the imaging device 81, during use of the imaging device 81, at least partly coincides with an optical path 71 of the electromagnetic radiation generated by the solidifying device 7, during use of the solidifying device. It should be expressly noted in this respect, that the imaging device 81 and the solidifying device 7 do not necessarily have to be operated at the same time, although this is conceivable. For instance, in an embodiment, the characteristic is only registered when the solidifying device is free from emitting electromagnetic radiation. In the embodiment shown, use is made of an optical device, such as a semi-transparent mirror element, or a single lens reflex arrangement, to be able to obtain an image of the calibration area, using the registering means 81, via the deflector unit 74, and to use the information obtained by the registering means 81, to calibrate or control the deflector unit 74 and/or the solidifying device 7 for controlling the position of electromagnetic radiation on the surface level L of the bath of material.

Advantageous of the apparatus 1 according to the invention, is that a step of registering the characteristic related to the surface level L of the bath of material 4 may be repeated at least once during the production of the object 2.

In particular, the method according to the invention provides the possibility of solidifying the layer of material, and repeating the step of registering the characteristic directly after the step of solidifying. This means that calibration is possible after solidifying of each, or a plurality of layers, which renders calibration during production of an object possible.

Figure 3:
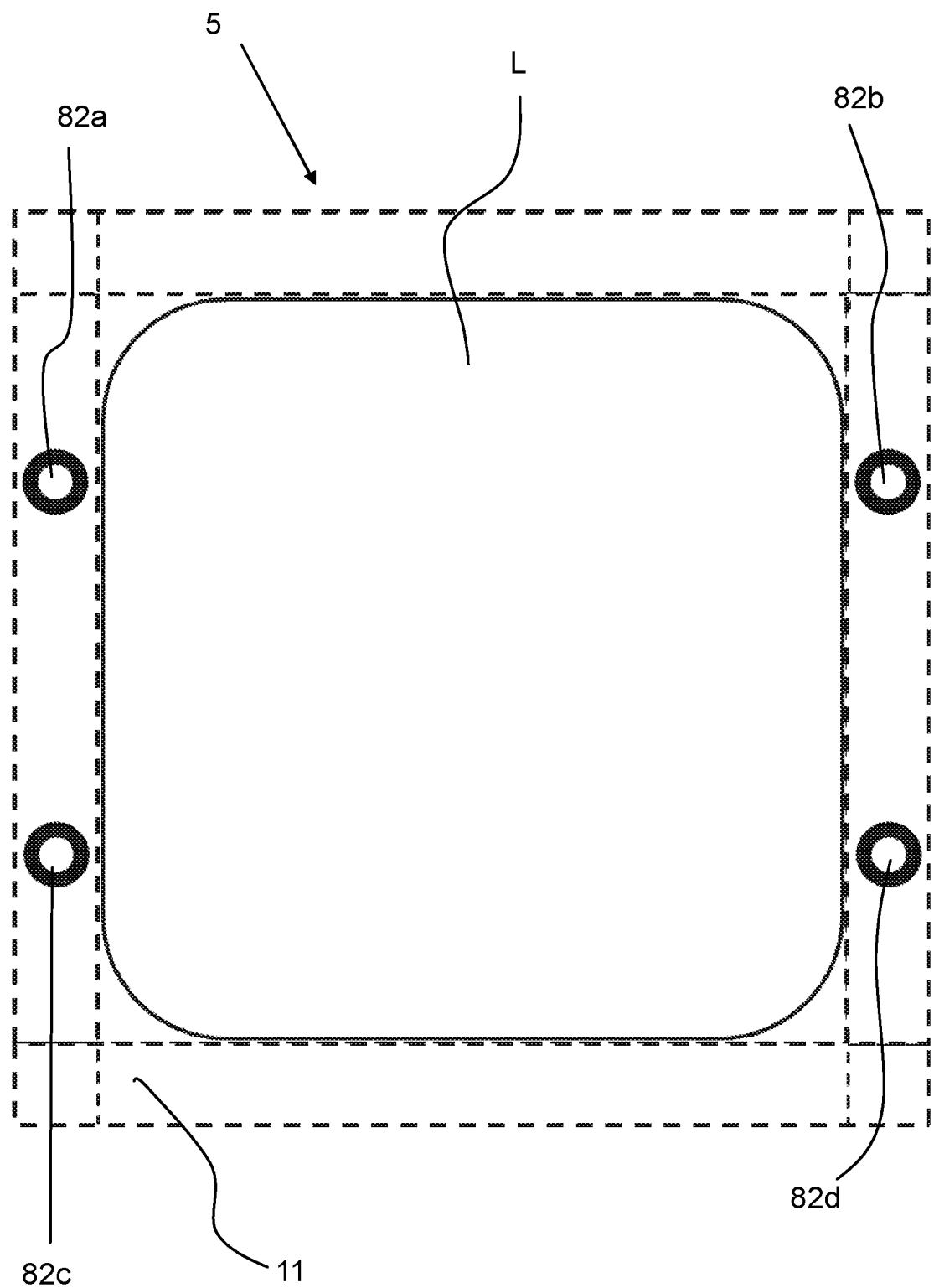
FIG. 3 is a schematic top view of the support of the apparatus according to an embodiment of the invention.

FIG. 3 shows a schematic overview of a top side of the lower frame part 11 with the top part of the support 5 and surface level L of the bath of material. Here it can be seen that a total of four elements 82a-82d are provided. These four elements may be registering devices for directly registering electromagnetic radiation emitted by the solidifying device. However, these four elements 82a-82 may also be the calibration elements as described in detail with respect to FIG. 2. The elements 82a-82d are positioned on two opposed sides of the generally rectangular bath of material 4. With the registering of the geometric position of the four elements 82a-82d, it is possible to use interpolation to more accurately control the position of electromagnetic radiation on the surface level L of the bath of material.

Figure 4:
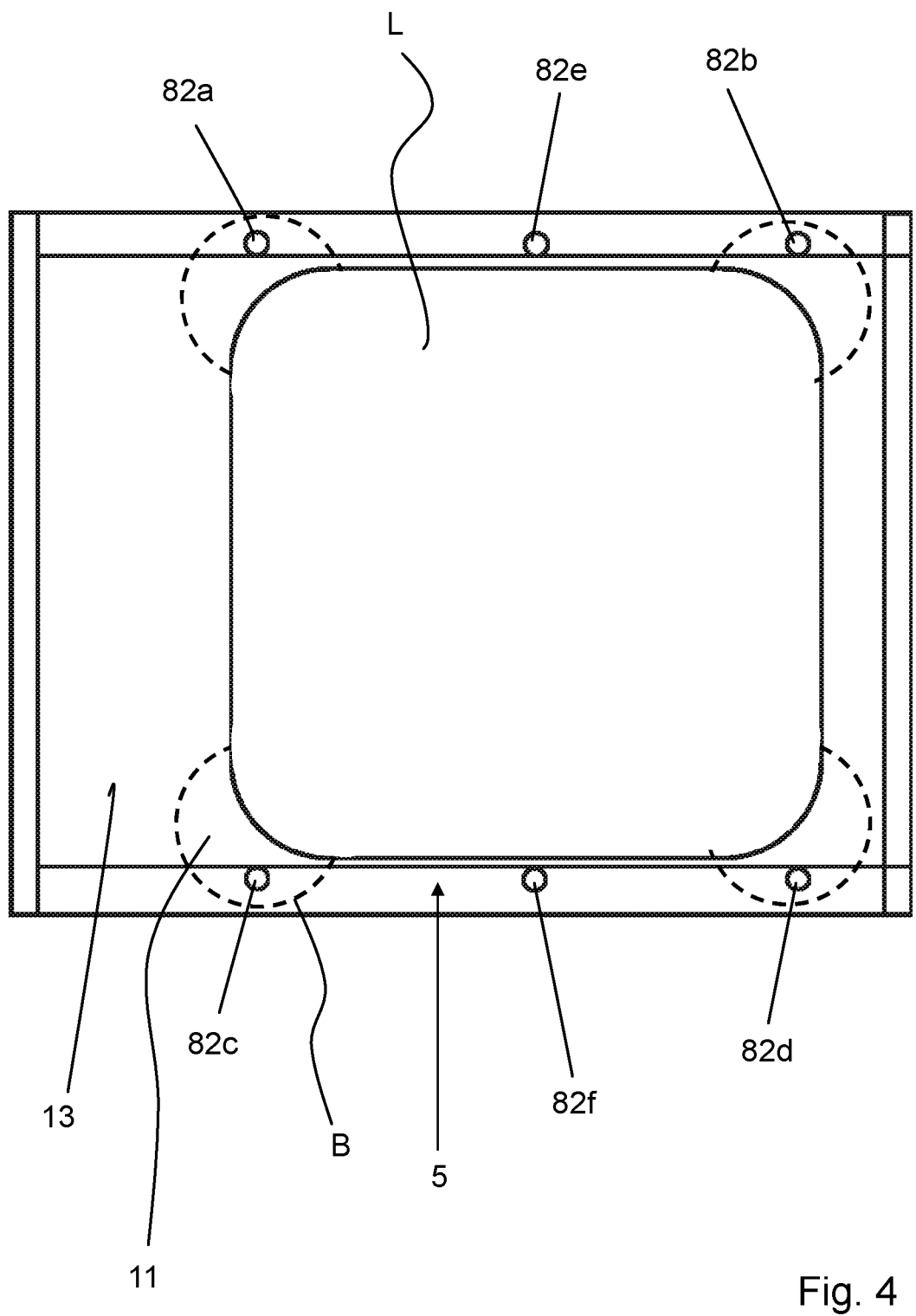
FIG. 4 is a schematic top view of the support of the apparatus according to a further embodiment of the invention.

FIG. 4 shows a further schematic overview of an embodiment of the top side of the lower frame part 11 with the top part of the support 5 and surface level L of the bath of material. Here it can be seen that a total of six elements 82a-82f are provided. As for FIG. 3, these six elements may be registering devices for directly registering electromagnetic radiation emitted by the solidifying device, or may be calibration elements as described in detail with respect to FIG. 2. Here it can be seen that four elements 82a-82d are assigned to the lower part frame 11 to which the support 5 is thermally connected, whereas two elements 82e-82f are assigned to the top frame part 13 to which the solidifying device 7 is thermally connected. This embodiment provides the advantage that temperature gradients within the apparatus and subsequent effects of thermal expansion may be registered. In particular, by using elements 82a-f connected to either one of the top frame 13 and the bottom frame 12, it is possible to account for differences in thermal expansion, for instance due to different operating temperatures, or different thermal expansion coefficients. It is also conceivable that it is accounted for thermal expansion of the object to be produced, for instance by adapting the apparatus settings and vectors to be followed by the solidifying device, for instance by slightly increasing the size of the contours of the object to be produced.

Figure 5:
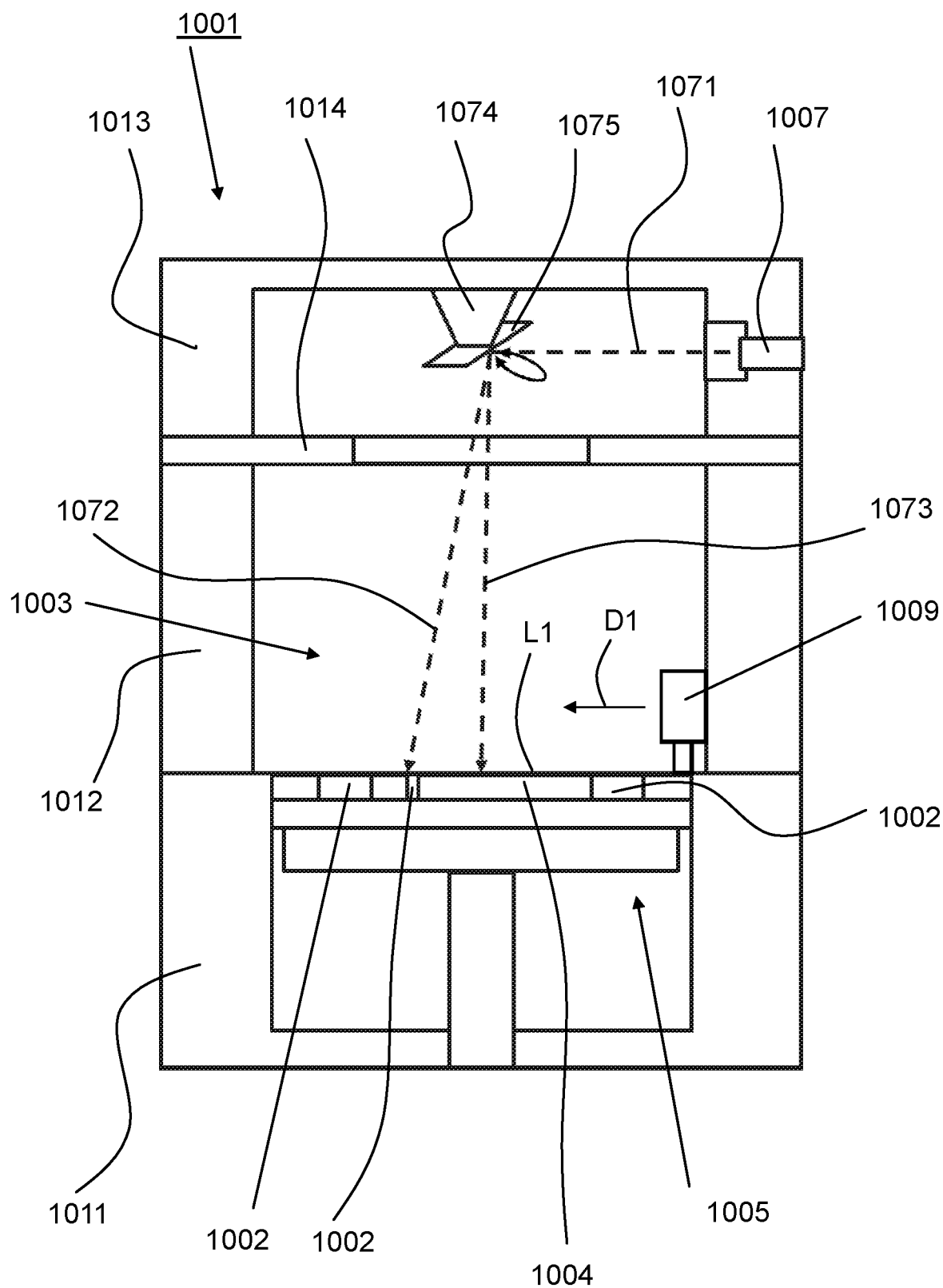
FIG. 5 is an overview of an apparatus according to the present invention, from a second point of view, for additive manufacturing an object.

FIG. 5 shows an overview of an apparatus 1001 for producing an object 1002 by means of additive manufacturing. The apparatus 1001 is build from several frame parts 1011, 1012, 1013. The apparatus comprises a process chamber 1003 for receiving a bath of material 1004 which can be solidified. In a lower frame part 1011, a shaft is formed, wherein a support 1005 is provided for positioning the object 1002 in relation to the surface level L1 of the bath of material 1004. The support 1005 is movably provided in the shaft, such that after solidifying a layer, the support 1005 may be lowered, and a further layer of material may be solidified on top of the part of the object 1002 already formed. In a top part 1013 of the apparatus 1001, a solidifying device 1007 is provided for solidifying a selective part of the material. In the embodiment shown, the solidifying device 1007 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 1071 emitted by the laser device 1007 is deflected by means of a deflector unit 1074, which uses a rotatable optical element 1075 to direct the emitted radiation 1071 towards the surface L1 of the layer of material 1004. Depending on the position of the deflector unit 1074, radiation may be emitted, as an example, according to rays 1072, 1073.

The apparatus 1001 shown further comprises a recoating device 1009 which can be displaced along the surface L1 of the bath for levelling the surface L1 of the bath of material 1004. The recoating device 1009 is moved along the surface of the bath, in the direction of movement D1. The recoating device 1009 according to the invention may be embodied in several ways, which will be explained by reference to FIGS. 6 to 9. In general, however, the recoating device according to the invention comprises at least one elongated levelling member having a plurality of levelling elements that face the surface of the bath and that are designed to be flexibly deflectable in a direction counter to the displacing direction D1.

FIG. 6a to 6c show a recoating device 1109 according to a first embodiment of the invention. As can be seen in FIGS. 6a and 6b, the recoating device 1109 comprises a general frame 1105, to which an elongated levelling member 1101 is attached. The elongated levelling member 1101 comprises a plurality of independent levelling elements 1103, each positioned side by side as seen in FIG. 6a. Between neighbouring levelling elements 1103, an interspace S is formed. The interspace is substantially equal to the width of the levelling elements 1103, as seen in the front view of FIG. 6a. Each of the plurality of the levelling elements 1103 is designed to be flexibly deformable in a direction opposite to the direction of displacement D1. The design according to the invention allows for a single levelling element 1103a to be deformed in a different manner compared to a further levelling element 1103b, which aids in the improvement of the uniformity and accuracy of the thickness of the levelling of the layer of material. This is best understood from FIG. 6c.

FIG. 6c shows the recoating device 1109 during use. The recoating device 1109 is displaced in the direction of movement, indicated by arrow D1, over the surface level L1 of the layer of material 4 to be solidified. A part of the object 1002 to be solidified protrudes from a desired surface level. This part 1002 is in the line of movement of one of the levelling elements 1103a, 1103b only. It can be seen that a first levelling element 1103a is not influenced by this part of the object, since the object 1002 is not in the line of movement of this first levelling element 1103a. The object is, however, in the line of movement of the second levelling element 1103b. Due to this, the second levelling element 1103b is flexed to a further extent, compared to the first levelling element 1103a. Thus, from the above it is clear that a small disturbance, for instance in the form of a protruding part of the object 1002, does only influence a relatively small part of the recoating device 1109, without affecting other parts of the recoating device 1109. This leads to improved control of the levelling of the surface layer L1 of the material 1004 to be solidified.

Figure 7A:
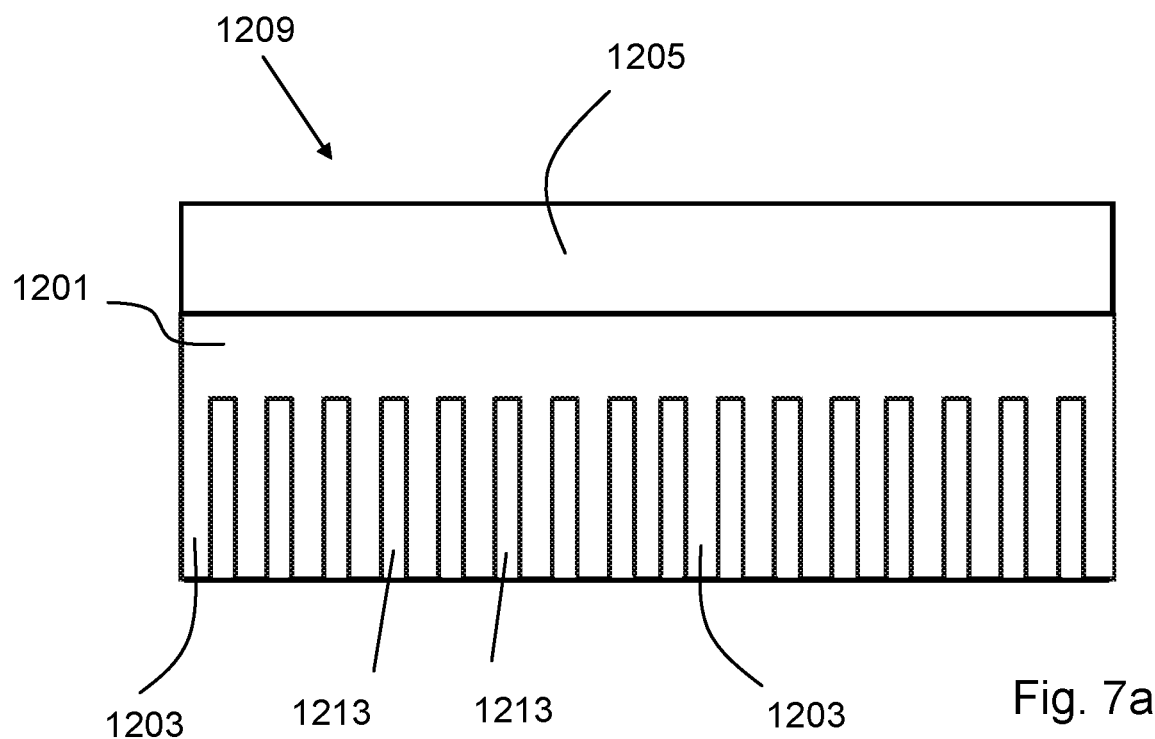
FIGS. 7a and 7b are a front view and side view of a second embodiment of the levelling member according to the present invention from a second point of view.
Figure 7B:
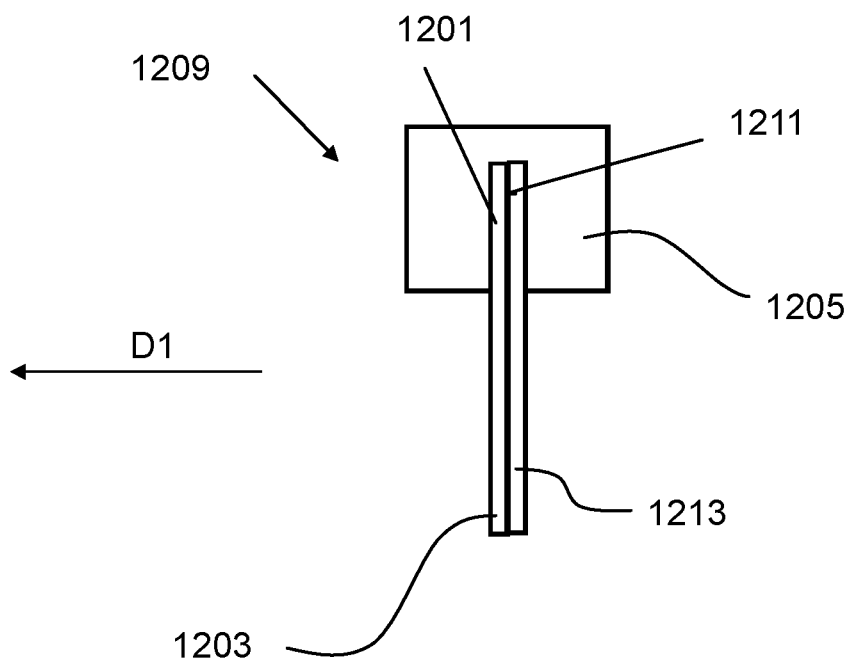

FIG. 7a to 7b show a recoating device 1209 according to a second embodiment of the invention. The recoating device 1209 comprises a general frame 1205, to which an elongated levelling member 1201 is attached. The elongated levelling member 1201 comprises a plurality of independent levelling elements 1203, each positioned side by side as seen in FIG. 7a. Between neighbouring levelling elements 1203, an interspace is formed. The recoating device 1209 according to the second embodiment comprises a further elongated levelling member 1211, which is best viewable in FIG. 7b. The further elongated levelling member 1211 is positioned behind the elongated levelling member 1201, as seen in the direction of movement. The further elongated levelling member 1211 comprises a plurality of further levelling elements 1213. In the embodiment shown, the further levelling elements 1213 are positioned in a staggered relationship with respect to the levelling elements 1203, such that a complete coverage of the surface layer L1 of material is obtained during movement of the recoating device 1209. Thus, parts of the material moving through the interspace formed by neighbouring levelling elements 1203 are levelled by the further levelling elements 1213 provided behind the levelling elements 1203. In the embodiment shown, the further levelling member 1203 is positioned directly behind the levelling member 1213.

Figure 8A:
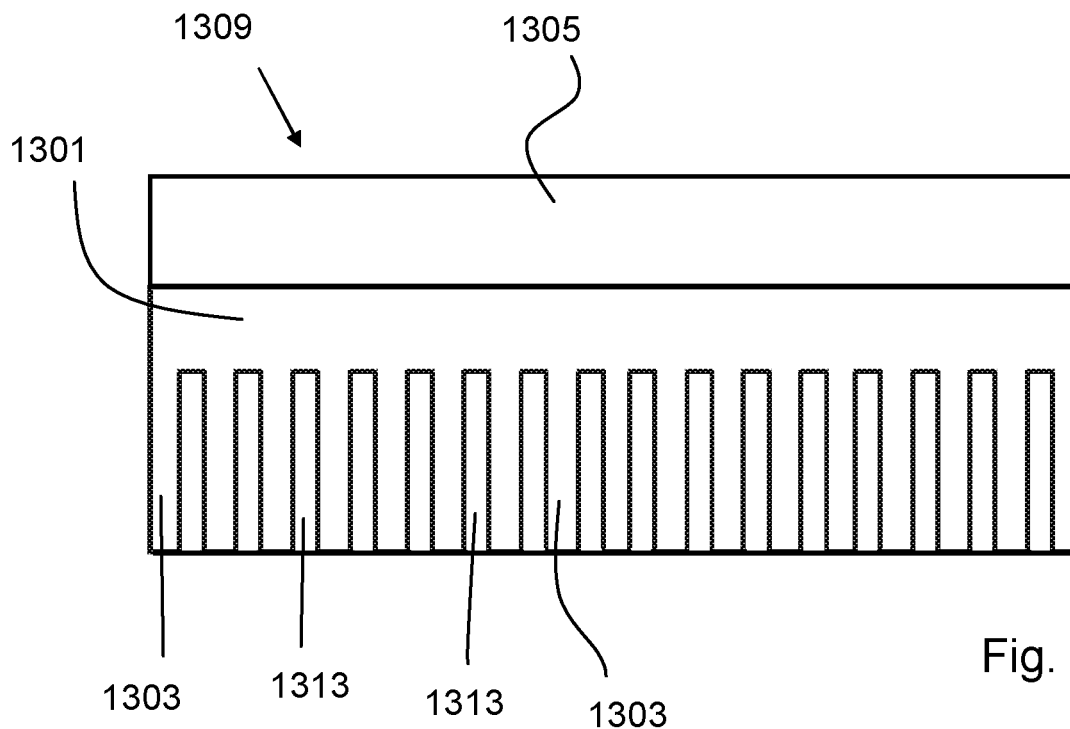
FIGS. 8a and 8b are a front view and side view of a third embodiment of the levelling member according to the present invention from a second point of view.
Figure 8B:
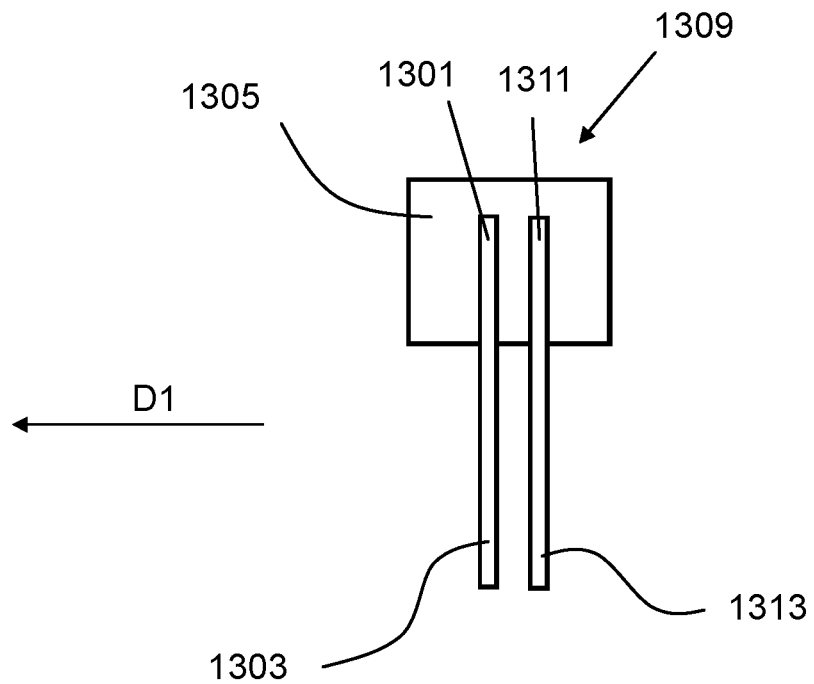

FIG. 8a to 8b show a recoating device 1309 according to a third embodiment of the invention. This embodiment is very similar to the second embodiment described by means of FIG. 7a to 7b. For reasons of conciseness, it is referred to the general description of that embodiment. The main difference in the third embodiment, is that the further levelling member 1311 is positioned at a distance S, or interspace S, from the levelling member 1301. This gives more room for independent flexion of the individual levelling elements 1303 and the further levelling elements 1313. The interspace may be designed, and it's parameters are mainly based on easy of manufacturing.

Figure 9A:
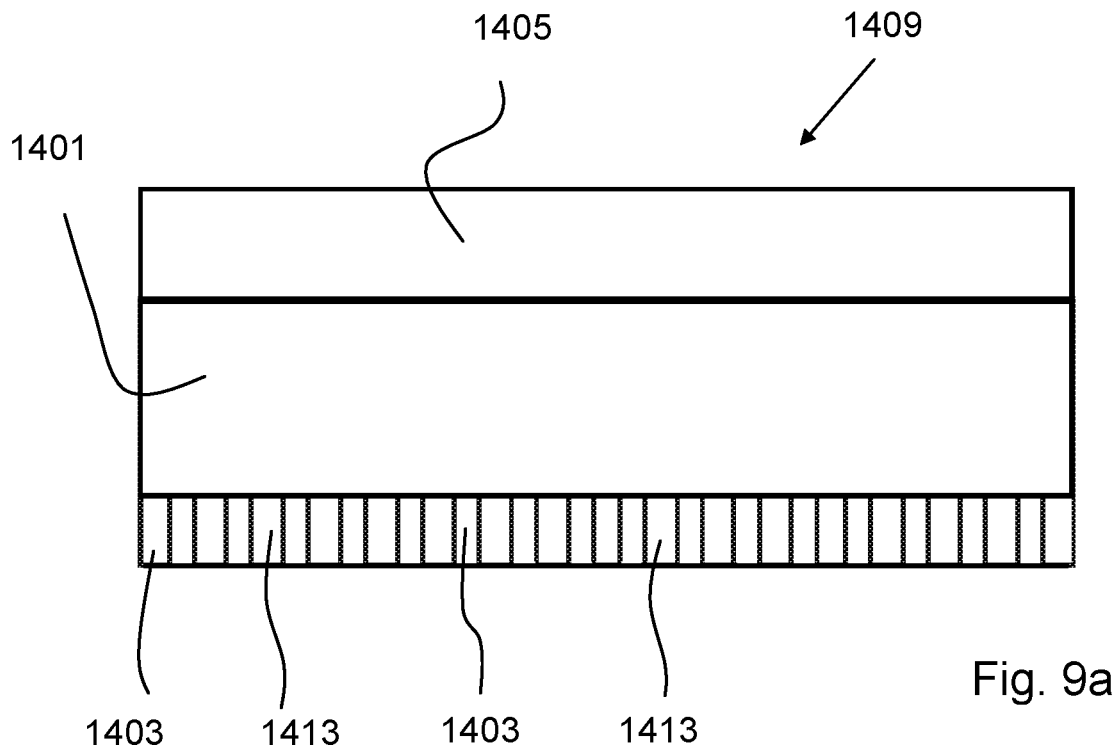
FIGS. 9a and 9b are a front view and side view of a fourth embodiment of the levelling member according to the present invention from a second point of view.
Figure 9B:
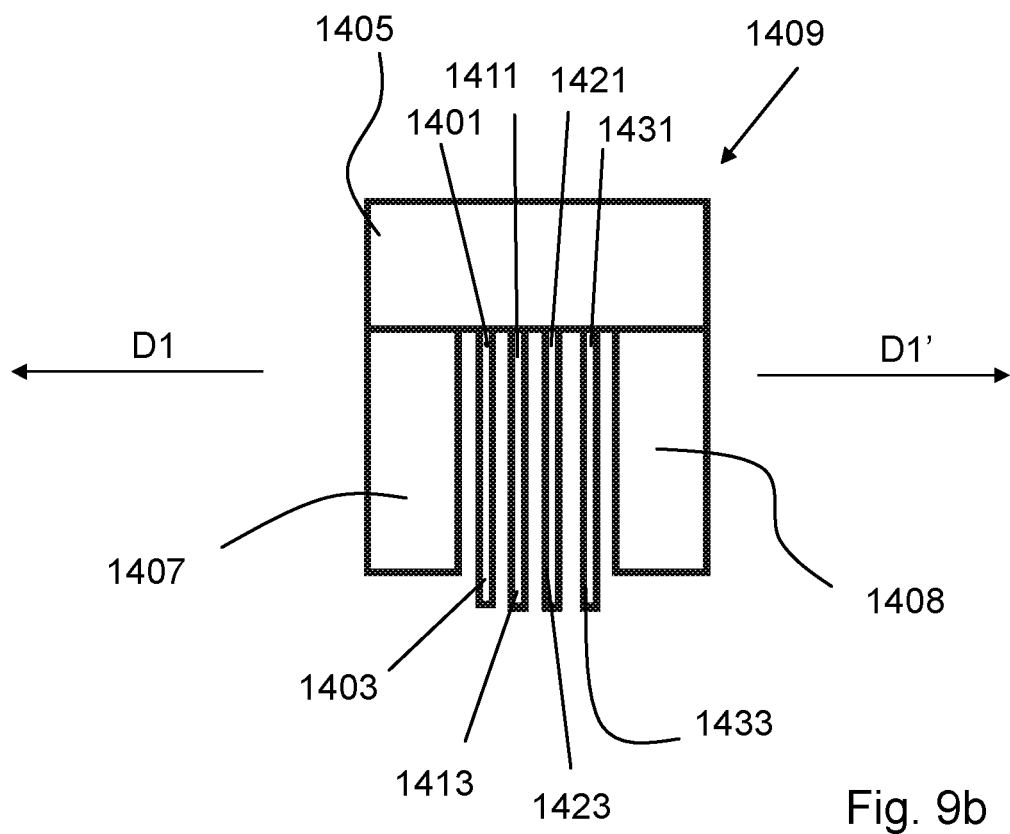

FIG. 9a to 9b show a recoating device 1409 according to a fourth embodiment of the invention. This embodiment is very similar to the third embodiment, and for reasons of conciseness mainly the differences will be described. As can be seen in FIG. 9b, a total number of four levelling members 1401, 1411, 1421, 1431 is used, each being positioned at distance from each other, as seen in the direction of movement. Each levelling member 1401, 1411, 1421, 1431 comprises a plurality of levelling elements 1403, 1413, 1423, 1433 that are flexibly deformable in a direction opposite to the direction of movement D1. In front of the recoating device 1409, a substantially rigid plowing member is provided. This plowing member is relatively thick compared to the elongated levelling member, and is designed to provide a first coarse step in levelling the layer of material. As can be seen in FIG. 9b, the recoating device is additionally provided with a further substantially rigid plowing member 1408, which is designed to be active when the recoating device 1409 is moved in a direction of movement D1' that is opposite to the direction of movement D1. This provides for a first coarse step in levelling the layer of material, independent of the fact whether the recoating device is moved in forward (D1) or backward (D1') direction. Thus, this improves the speed with which the layer of material may be levelled.

Figure 10A:
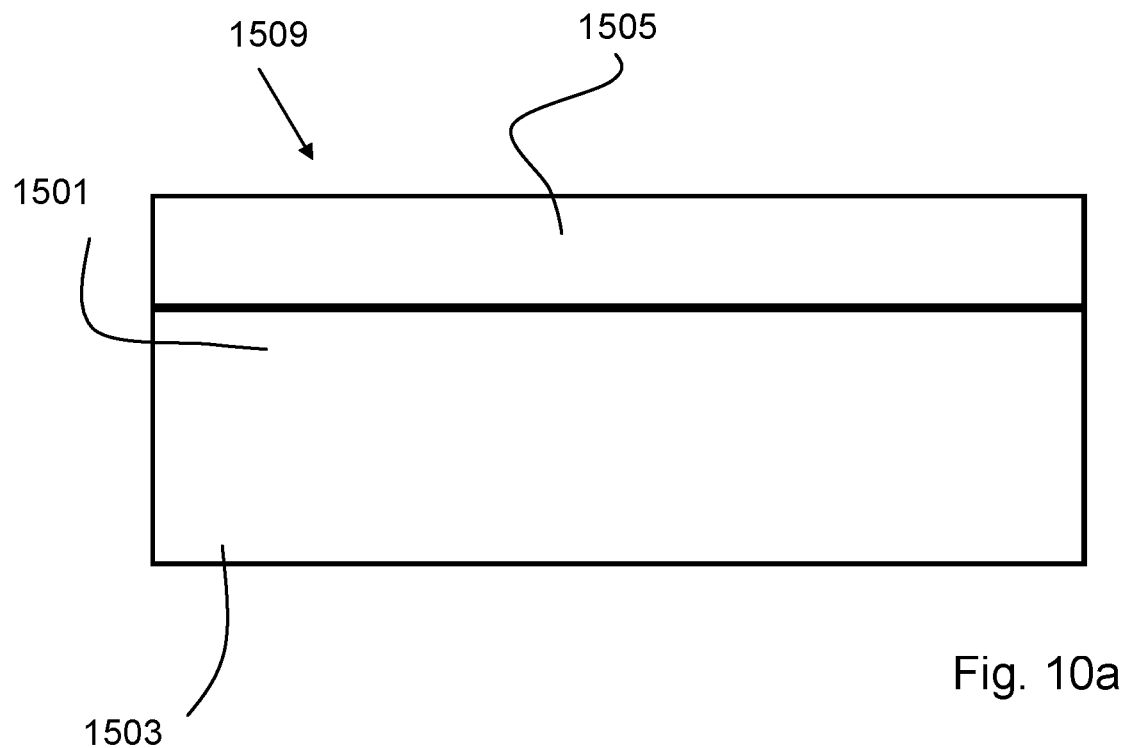
FIG. 10a-10c are a front view, and side views of a fifth embodiment of the levelling member according to the present invention from a second point of view.
Figures 10B, 10C:
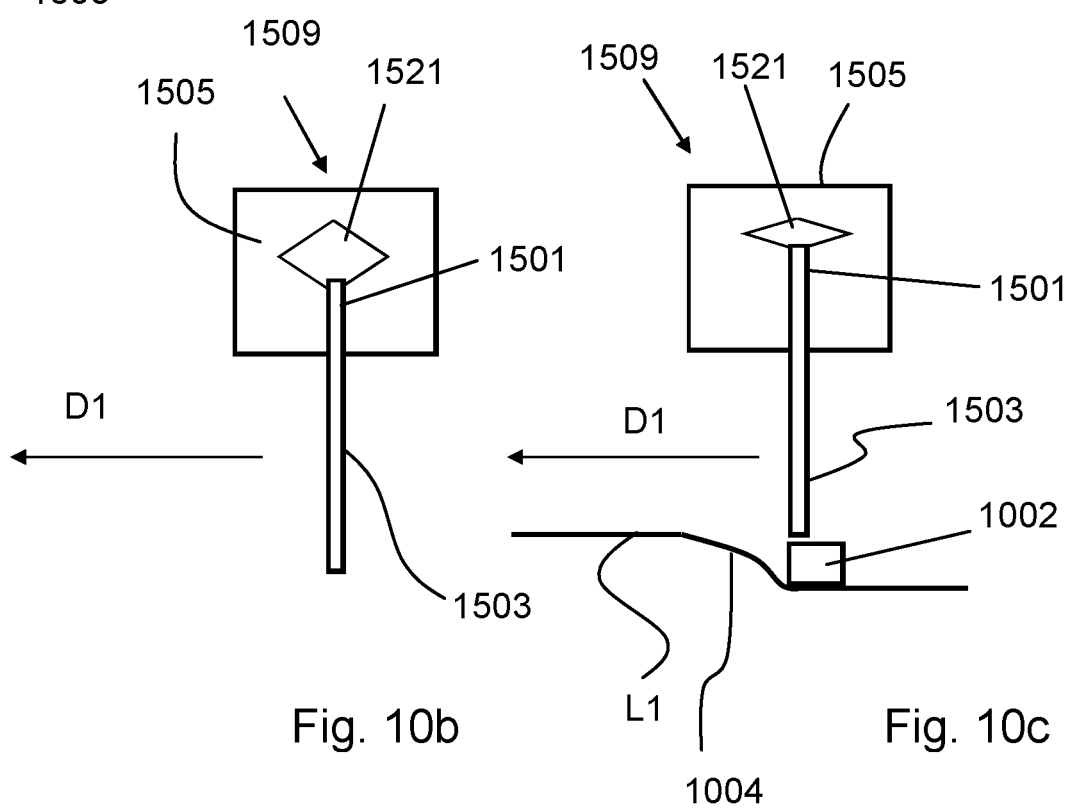

FIG. 10a to 10c show a recoating device 1509 according to a fifth embodiment of the invention. As can be seen in FIGS. 10a and 10b, the recoating device 1509 comprises a general frame 1505, to which an elongated levelling member 1501 is attached. The elongated levelling member 1501 comprises a single levelling element 1503. The levelling element 1503 is connected to the frame 1505 by means of a spring 1521, which allows the levelling element 1503 to move at least in a direction substantially transversal to the plane defined by the surface level L1 of the bath of material 1004. The levelling element may additionally be designed to be flexibly deformable in a direction opposite to the direction of displacement D1. The design according to the invention allows for a single levelling element 1503 to move upwards upon encountering a specific force thereon, for passing an object 1002, as can be seen in FIG. 10c. Thus with the spring 1521, the levelling element is flexibly connected to the elongated levelling member for allowing the levelling element to be displaced in at least the direction transversal to the plane defined by the surface of the bath upon encountering the force exceeding the threshold. It is noted that the levelling element, due to the relatively thin construction, is flexibly deflectable in a direction counter to the displacing direction as well.

Figure 11:
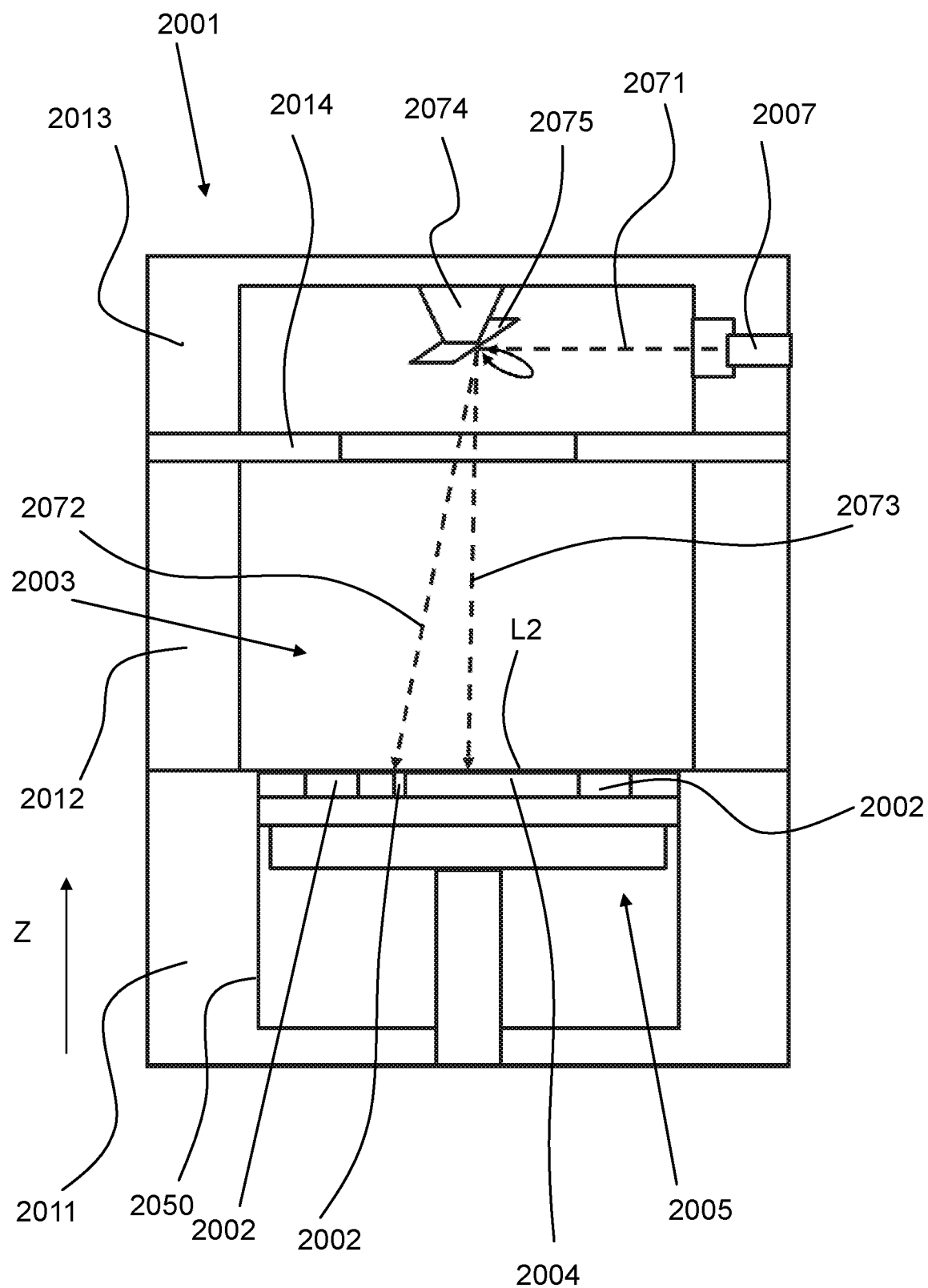
FIG. 11 is an overview of an apparatus according to the present invention from to a third point of view for additive manufacturing an object.

FIG. 11 shows an overview of an apparatus 2001 for producing an object 2002 by means of additive manufacturing. The apparatus 2001 is built from several frame parts 2011, 2012, 2013. The apparatus comprises a process chamber 2003 for receiving a bath of material 2004 which can be solidified. In a lower frame part 2011, a shaft is formed, wherein a support 2005 is provided for positioning the object 2002 in relation to the surface level L2 of the bath of material 2004. The support 2005 is movably provided in the shaft 2050, in a direction generally indicated by arrow Z, such that after solidifying a layer, the support 2005 may be lowered, and a further layer of material may be solidified on top of the part of the object 2002 already formed. In a top part 2013 of the apparatus 2001, a solidifying device 2007 is provided for solidifying a selective part of the material. In the embodiment shown, the solidifying device 2007 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 2071 emitted by the laser device 2007 is deflected by means of a deflector unit 2074, which uses a rotatable optical element 2075 to direct the emitted radiation 2071 towards the surface L2 of the layer of material 2004. Depending on the position of the deflector unit 2074, radiation may be emitted, as an example, according to rays 2072, 2073.

Figure 12:
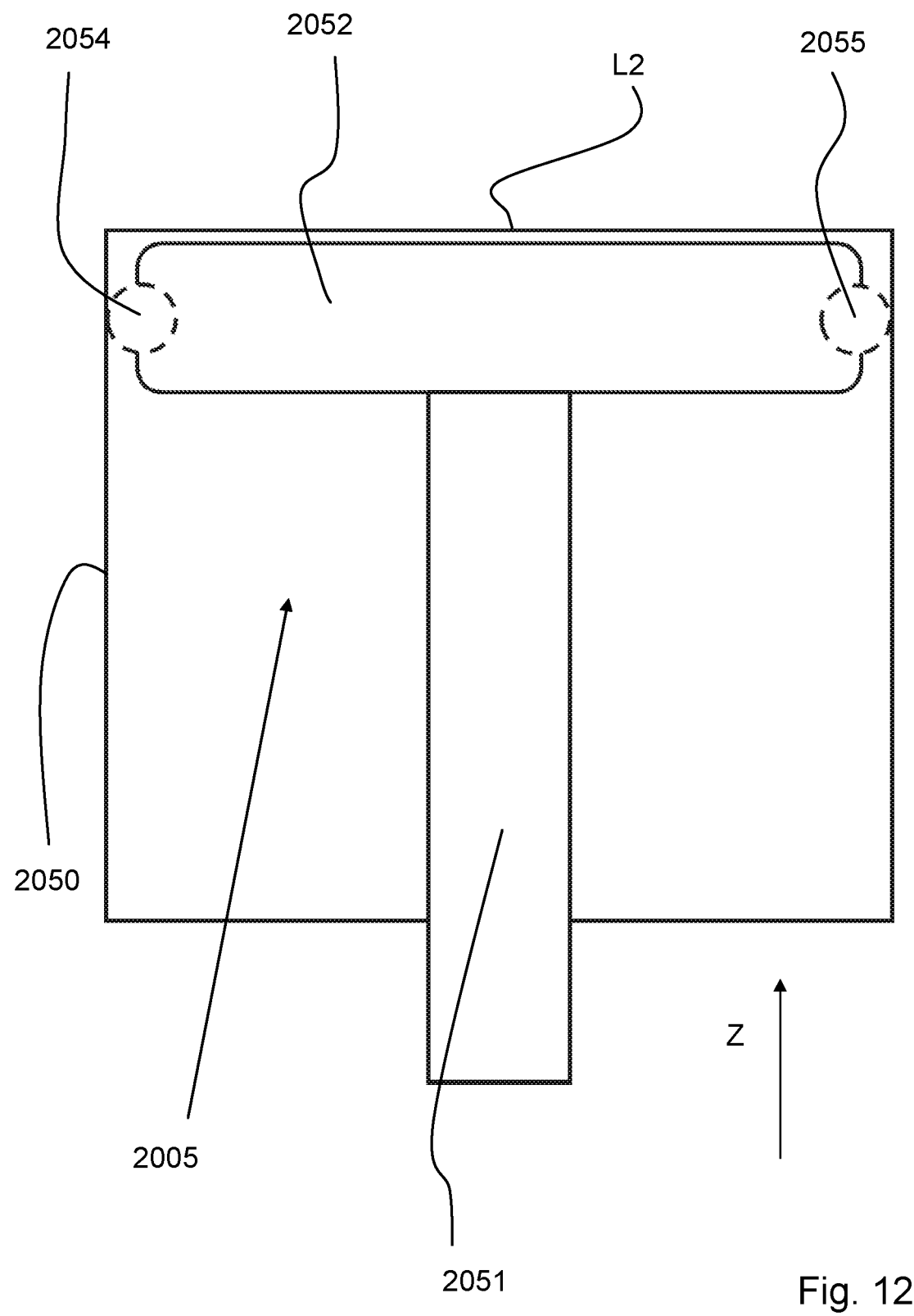
FIG. 12 is a side view of an embodiment of the movable support according to the invention from to a third point of view.

FIG. 12 shows a schematic side view of an embodiment of the support 2005 according to the invention. FIG. 12 shows the movable support 2005, having a build platform 2052 and a spindle 2051, which is movably provided, in a direction indicated by arrow Z, within a shaft 2050. Now referring back to FIG. 11, it can be seen that the shaft 2050 is part of the lower frame 2011, and that the movable support 2005 is movable within the shaft 2050 for positioning the build platform 2052 at a desired height in order to produce the object 2002. Now referring to FIG. 12, it can be seen that the support 2005, and in particular the build platform 2052, is provided with a first wheel element 2054 and a second wheel element 2055, both of which are displaceable along opposite walls of the shaft 2050. Thus, the support structure 2005 is provided with guiding means 2054, 2055 in contact with the shaft 2050 for guiding the support structure 2005 along the shaft 2050 during movement thereof.

Figure 13:
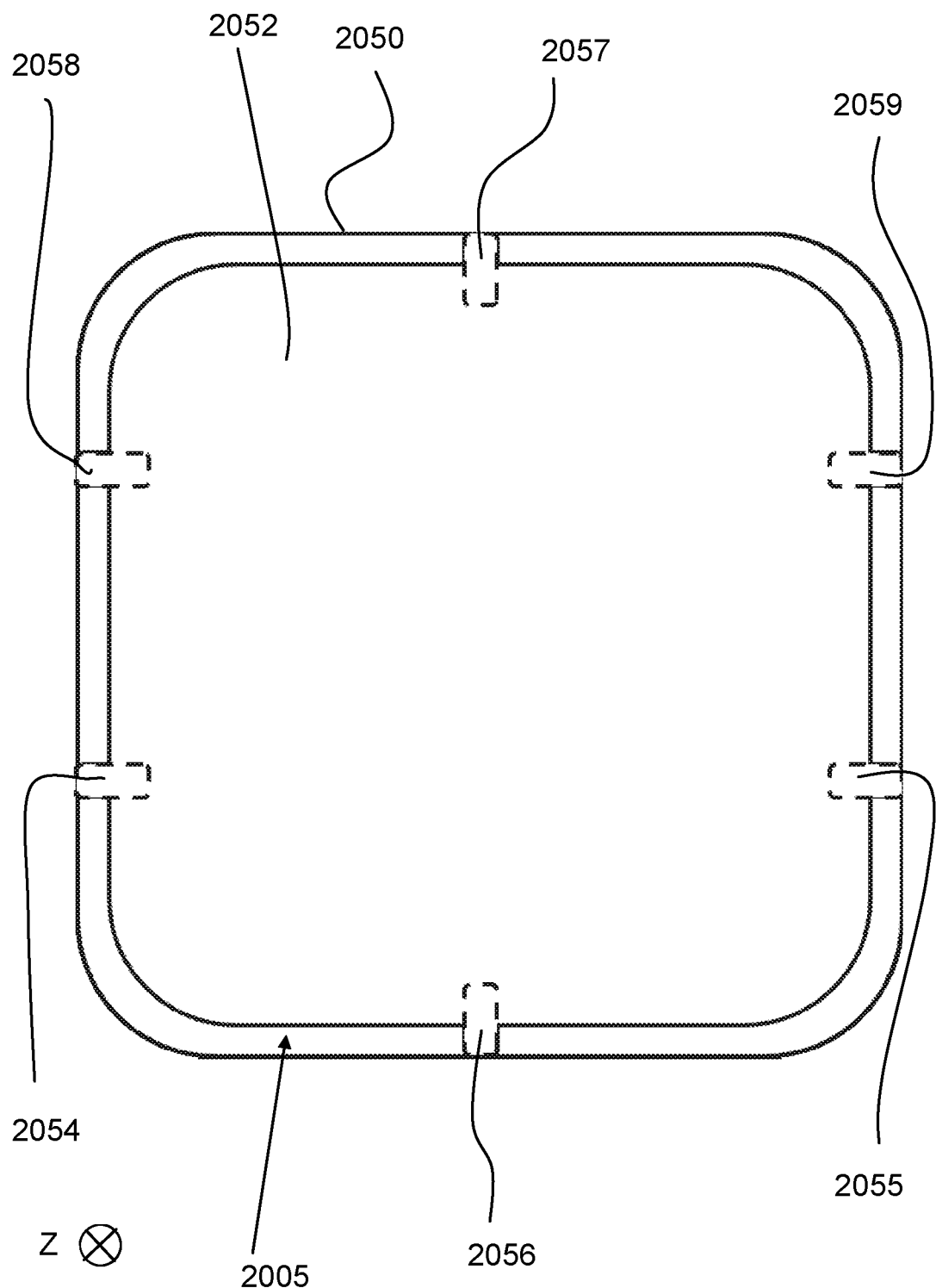
FIG. 13 is a top view of an embodiment of the movable support according to the invention from to a third point of view.

FIG. 13 shows a top view of an embodiment of the movable support 2005 having guiding means 2054-2059, preferably in the form of wheel elements. In total, six guiding elements 2054-2059, which can be wheel elements 2054-2059, are visible in FIG. 13, although it is conceivable to use more or less guiding elements. Furthermore, it can be seen that pairs of opposing guiding elements are formed here. For instance, guiding element 2054 is positioned opposite to guiding element 2055, guiding element 2056 is opposed to guiding element 2057, and guiding element 2058 is opposed to guiding element 2059. The positioning of these pairs of guiding elements 2054-2059, preferably in the form of guiding wheels 2054-2059, aids in constraining the degrees of freedom. It is noted that a small offset may be present, between opposed guiding elements, without substantially affecting the constraining in the degrees of freedom.

Figure 14:
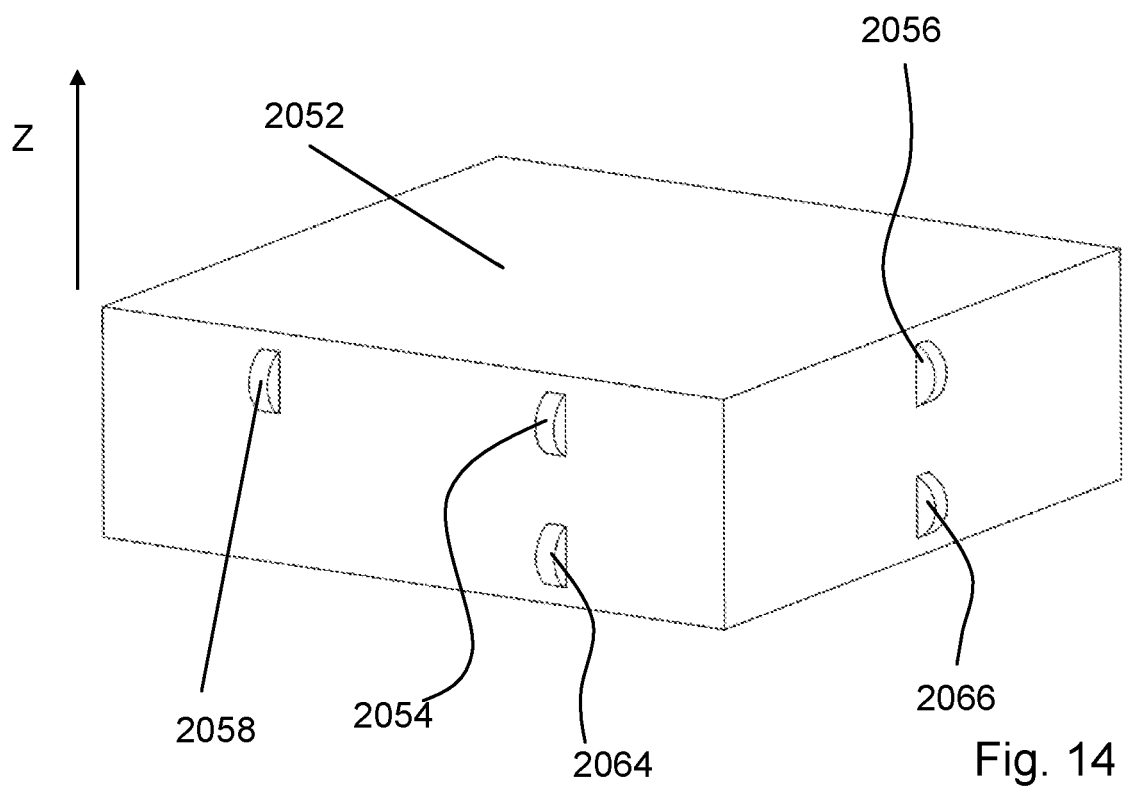
FIG. 14 is a perspective view of an embodiment of the movable support according to the invention from to a third point of view.

FIG. 14 shows a schematic view in perspective of a further embodiment of the build platform 2052 of the movable support, having all guiding elements as described with respect to the top view of FIG. 13, and having additional pairs of guiding elements, for which only a single guiding element 2064, 2066 is visible in FIG. 14. It is noted that directly opposite each of the two guiding elements 2064, 2066 a further guiding element, preferably in the form of a guiding wheel, is provided. The further guiding elements are positioned directly below the guiding elements 2057, 2055 depicted in FIG. 13, such that opposing pairs of guiding elements are formed.

In principle any solid object has a total of 6 degrees of freedom (DOF): 3 DOF for translational movements and 3 DOF for rotational movements. By using the pairs of guiding elements 2054-2059 in FIG. 13, and 2054-2059, 2064, 2066 in FIG. 14, the number of DOF are reduced, by constraining certain movements. The guiding means shown in FIG. 13 would constrain any DOF related to translational movement and/or rotational movement within a plane defined by the surface of the build platform 2052, i.e. within the plane defined by the drawing of FIG. 13. The guiding means shown in, and described with respect to, FIG. 14, having a total of 5 pairs of guiding elements, would additionally constrain the remaining DOF related to rotational movement, such that only the DOF related to movement in the axial direction (indicated by arrow D2), i.e. the desired movement of the build platform 2052, remains unconstrained.

Figure 15:
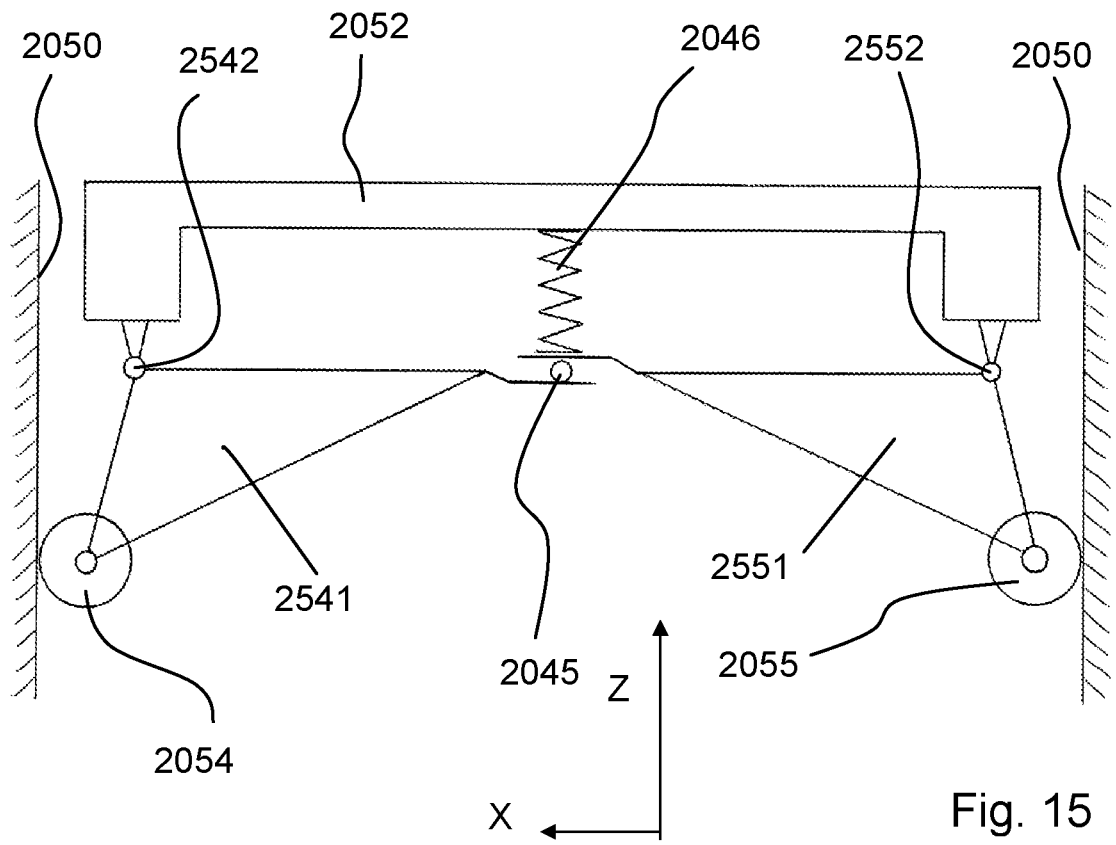
FIG. 15 is a side view of an embodiment of the movable support according to the invention from to a third point of view.

FIG. 15 schematically shows an embodiment of a pair of guiding elements for a movable support structure. FIG. 15 schematically shows the shaft in the form of two opposed wall parts 2050, 2050', within which the build platform 2052 is movably provided. The build platform 2052 is movable in the direction Z by means of, for example, a spindle, as also indicated in FIGS. 11 and 12. Other ways of driving the support structure 2052 in the direction Z are conceivable of course, and the way of driving is not limited to the invention.

According to the invention, from the third point of view, guiding elements in the form of a wheel element 2054 and a further wheel element 2055 are provided. The wheel element 2054 is connected to the build platform 2052, by means of a suspension element 2541, and is movable along a first wall 2050 of the shaft. The further wheel element 2055 is also connected to the build platform by means of a further suspension element 2551, and is movable along a second wall 2050' of the shaft. The first wall 2050 of the shaft is directly opposed to the second wall 2050', and is facing said second wall 2050'. The suspension elements 2541, 2551 are each pivotally connected to the build platform 2052, such that pivotal movement about axes 2542, 2552, respectively, of the suspension elements 2541, 2551 is possible. As can be seen in FIG. 15, the suspension element 2541 and the further suspension element 2551 are movably coupled to each other by means of a coupling element 2045, in the form of a hinge element 2045. The coupling element furthermore comprises a spring and/or damping member 2046, which is connected to the build platform 2052 of the movable support structure and, in the embodiment shown in FIG. 15, to the further suspension element 2551. It is noted that the spring and/or damping member 2046 may additionally or alternatively be connected to the suspension element 2541.

The coupling between the suspension element 2541 and the further suspension element 2551 is such that these elements 2541, 2551 are interlinked to be pivotably movable in opposite directions. The spring and/or damping element 2046 is designed to be a compression spring, which presses onto the hinge 2045, and biases or urges the wheel elements 2054, 2055 outwards, such that both wheels 2054, 2055 are in good contact with their respective wall 2050, 2050'. The construction described above implies that if the support structure experiences thermal expansion, for instance in the direction indicated by arrow X, then the axes 2542, 2552 will be positioned further apart, which, in the prior art, may lead to uncertainties in the exact position of the build platform 2052. With the structure described above, the compression spring 2046 urges the wheel elements 2054, 2055 into contact with their respective wall parts 2050, 2050' with the center part of the support structure 2052 being positioned exactly in between the wall parts 2050, 2050'. Thus, the guiding means described here with respect to FIG. 15 may be used to ensure an accurate and reproducible positioning of the build platform 2052, even in cases where temperature gradients lead to thermal expansion of the build platform 2052 and/or the shaft.

It is noted that all five pairs of guiding elements described and shown in FIG. 14 are, in an embodiment, construed as the pair of guiding elements shown in FIG. 15, enabling an accurate and reproducible positioning in all translational and rotational DOF, except for translational movement in the Z direction.

Figure 16:
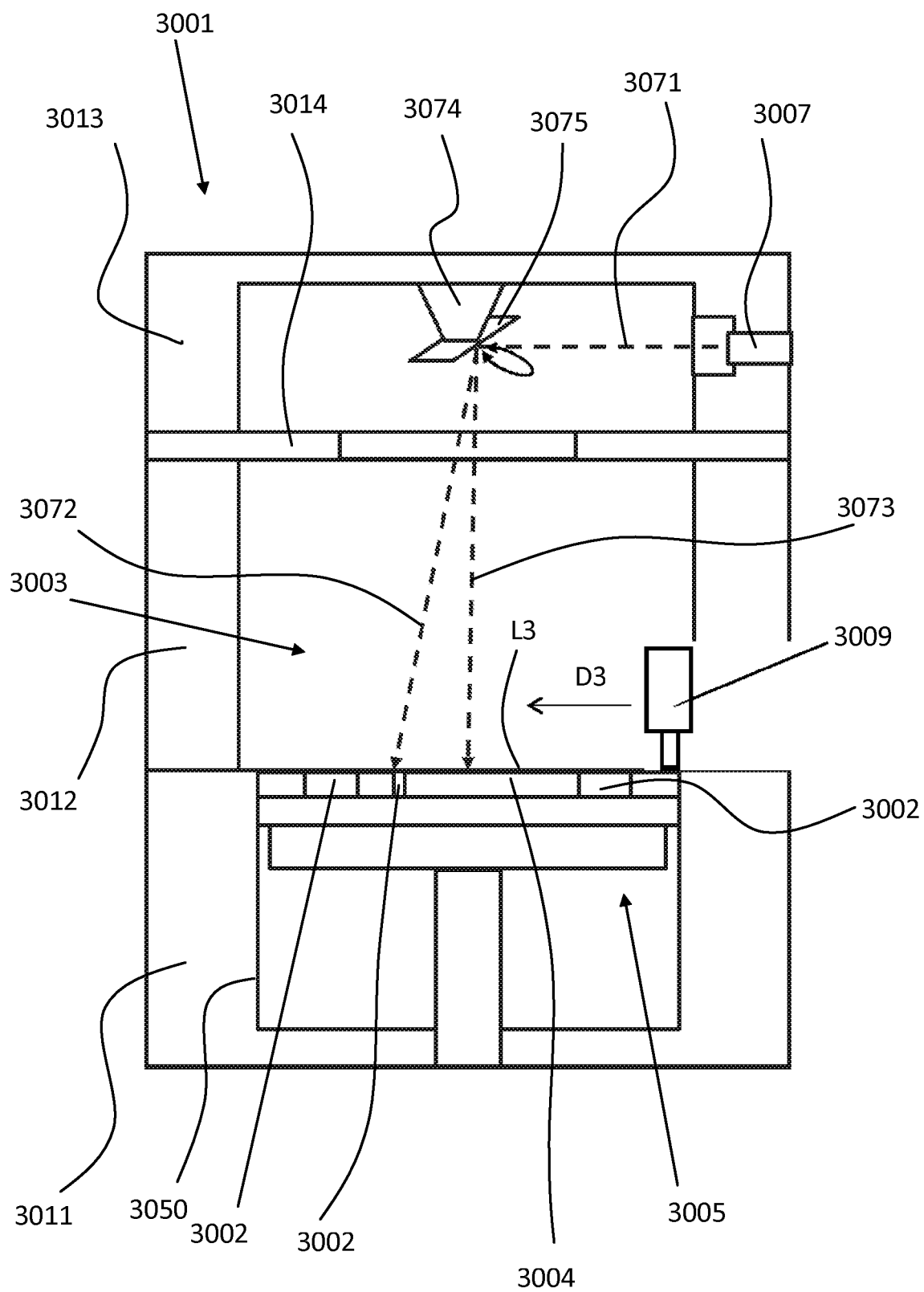
FIG. 16 is an overview of an apparatus for additive manufacturing an object according to a fourth point of view.

FIG. 16 shows an overview of an apparatus 3001 for producing an object 3002 by means of additive manufacturing. The apparatus 3001 is built from several frame parts 3011, 3012, 3013. The apparatus comprises a process chamber 3003 for receiving a bath of material 3004 which can be solidified. In a lower frame part 3011, a shaft is formed, wherein a support 3005 is provided for positioning the object 3002 in relation to the surface level L3 of the bath of material 3004. The support 3005 is movably provided in the shaft, such that after solidifying a layer, the support 3005 may be lowered, and a further layer of material may be solidified on top of the part of the object 3002 already formed. In a top part 3013 of the apparatus 3001, a solidifying device 3007 is provided for solidifying a selective part of the material. In the embodiment shown, the solidifying device 3007 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 3071 emitted by the laser device 3007 is deflected by means of a deflector unit 3074, which uses a rotatable optical element 3075 to direct the emitted radiation 3071 towards the surface L3 of the layer of material 3004. Depending on the position of the deflector unit 3074, radiation may be emitted, as an example, according to rays 3072, 3073.

Figure 17A:
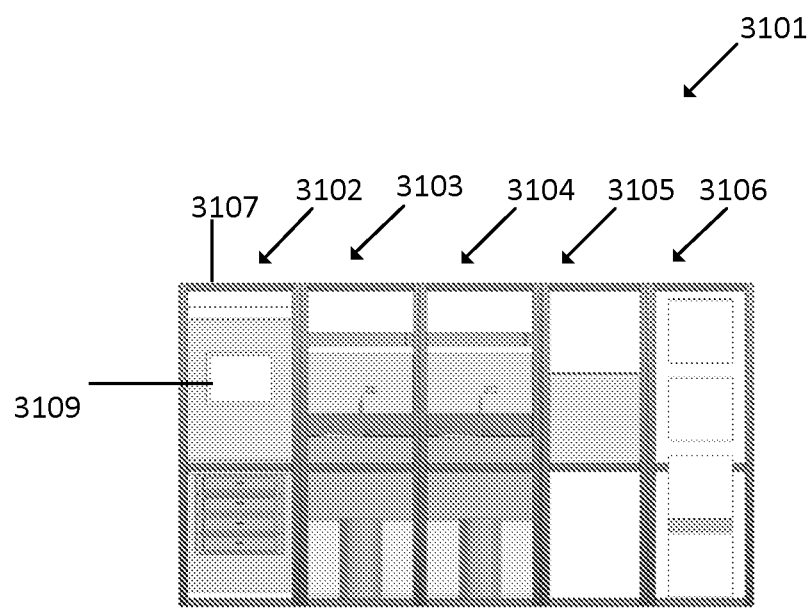
FIG. 17a is an overview of a modular system for producing an object by means of additive manufacturing, according to the present invention from to a fourth point of view.
Figure 17B:
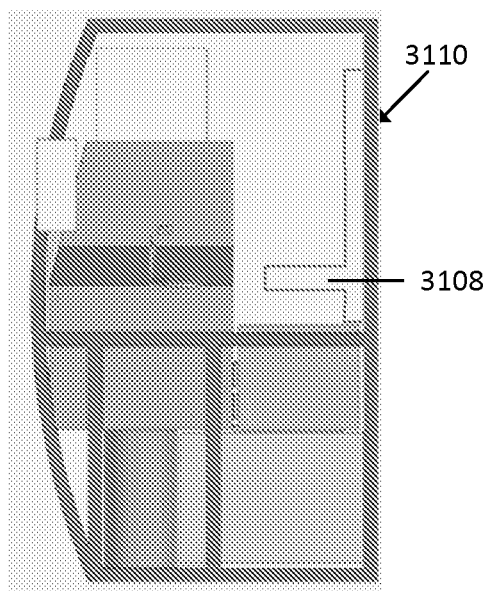
FIG. 17b is a cross sectional view of the modular system, showing the handling robot according to the present invention from to a fourth point of view.

FIGS. 17a 17b show the modular system 3101 for producing an object by means of additive manufacturing from different angles. The modular system 3101 comprises a control module 3102, two adjacently placed and connected additive manufacturing modules 3103, 3104, a heat treatment module 3105 and an exchange module 3106.

The additive manufacturing modules 3103, 3104 comprise a process chamber for receiving a bath of material which can be solidified and a solidifying device for solidifying a selective part of the material for producing said object.

The control module 3102 may be equipped with a user interface 3109 for inputting various data relating to the process of producing the object. Such data may, for example, be the models of the objects to be produced, the specific order and the type of modules provided in the modular system 3101, etc.

Further, each of the modules 3102, 3103, 3104, 3105, 3106 may be provided with a frame 3107, which frame 3107 is used for connecting the modules to each other.

In FIG. 17b, the handling robot 3108 is shown, which is guided over the single guiding rail which is placed, or mounted, at the back side 3110 of the modules 3102, 3103, 3104, 3105, 3106.

Figure 18:
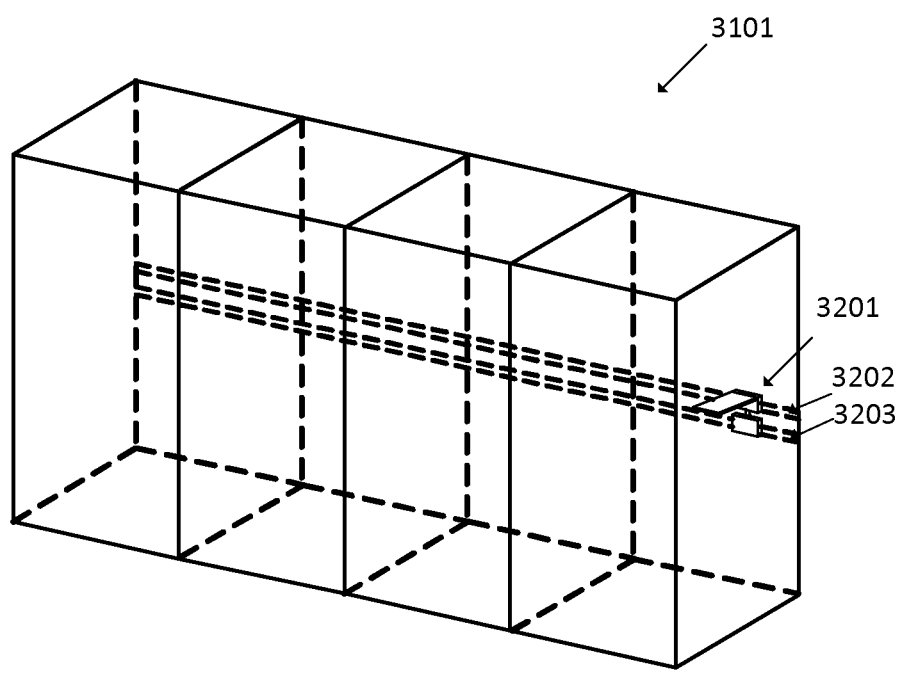
FIG. 18 is an example showing the handling robot and the single guiding rail, according to the present invention from to a fourth point of view.

FIG. 18 is an example showing the handling robot 3201 and the single guiding rail 3202, 3203, according to the present invention.

Here, the single guiding rail comprises two different parts, i.e. referred to with reference numeral 3202 and 3203, such that data communication and the provisioning of power from the control module to the handling robot 3201 is made possible. The data communication and the provisioning of power may then be transported over these two parts 3202, 3203.

Figure 19:
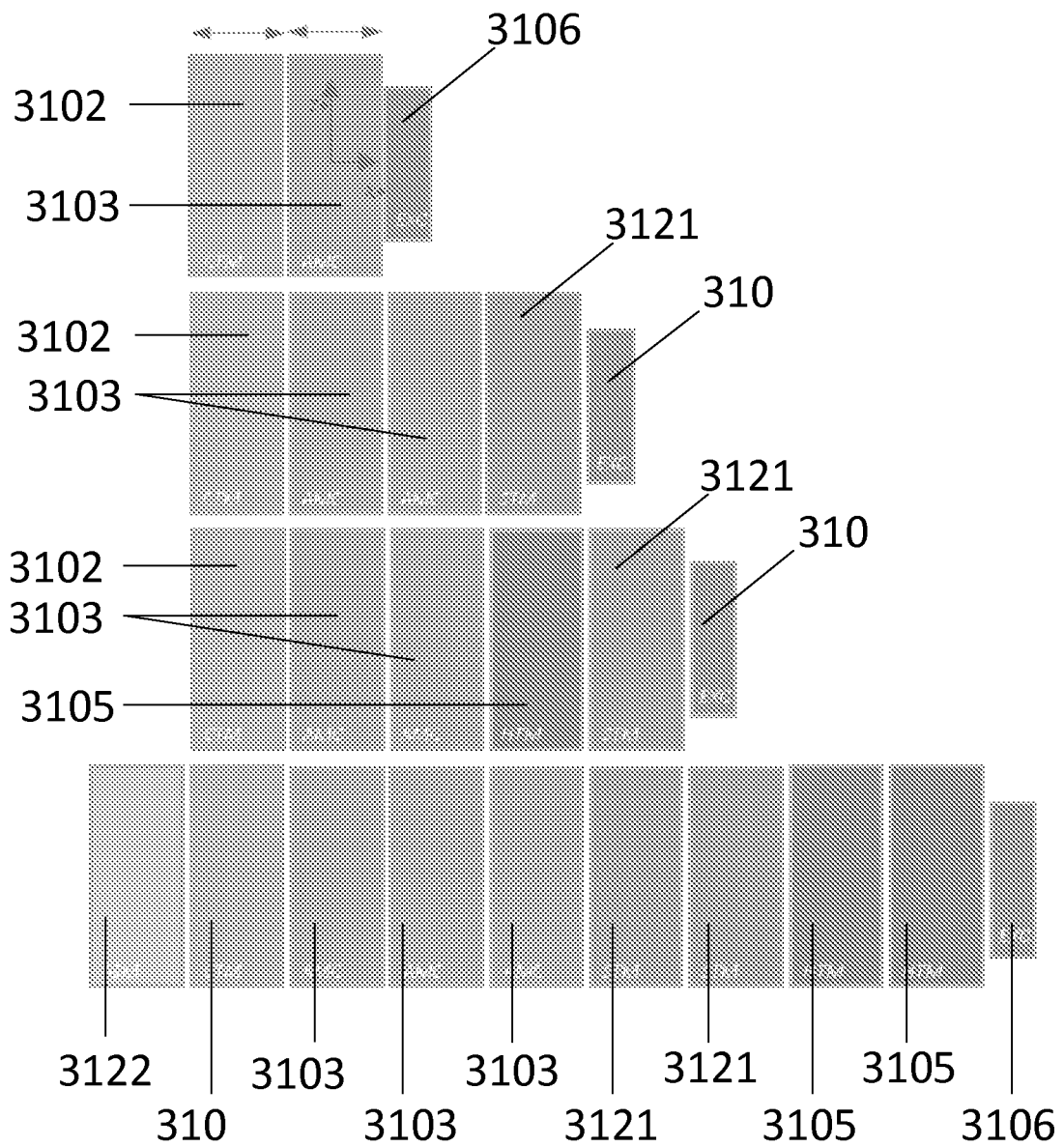
FIG. 19 discloses different types of examples of modular systems for producing an object, according to the present invention from to a fourth point of view.

FIG. 19 discloses different types of examples of modular systems for producing an object, according to the present invention.

In the top example, a control module 3102 is adjacently positioned to an additive manufacturing module 3103, which is then connected to the exchange module 3106. This setup is considered to be the minimal setup of the system to function properly.

In more advanced setups, i.e. the $2^{nd}$ setup from the top, the control module 3102 is connected to two adjacently positioned additive manufacturing modules 3103, which are subsequently connected to a storage module 3121, and finally ending with an exchange module 3106.

An even more detailed setup is shown in the $3^{rd}$ setup from the top, where a single control module 3102 is connected to two adjacently positioned additive manufacturing modules 3103, which are connected to a heat treatment module 3105, a storage module 3121 and an exchange module 3106.

Finally, a very detailed and extended setup is shown in the $4^{th}$ setup from the top, in which a monitoring module 3122 is connected to a control module, which is connected to three adjacently positioned additive manufacturing modules 3103, which are connected to two storage modules 3121, which are connected to two heat treatment modules 3105, which are finally connected to an exchange module 3106. This setup may, for example, be used for mass production of objects.

Figure 20:
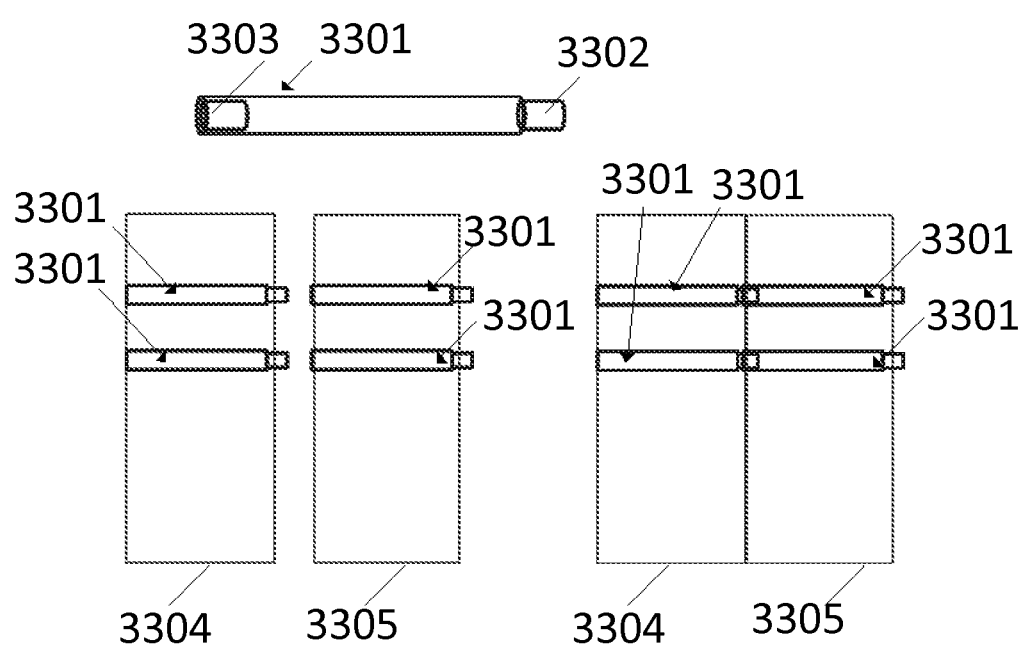
FIG. 20 discloses an example of a specific interconnecting guiding element, as well as interconnecting guiding elements forming a single guiding rail.

FIG. 20 discloses an example of a specific interconnecting guiding element 3301, as well as interconnecting guiding elements forming a single guiding rail.

In the present example, the interconnecting guiding element 3301 comprises, at a first end thereof, a dowel pin 3302 and, at a second end thereof, a corresponding hole 3303.

The dowel pin 3202 may have a smaller diameter than its corresponding hole 3303 such that it can freely slip in, or may have a larger diameter so that it must be pressed into its hole 3303.

Two modules 3304, 3305, may then be connected to each other by aligned the modules next to each other such that the dowel pin 3302 of the first module 3304 is aligned with the hole 3303 of the second module 3305. By connecting the first module 3304 with the second module 3305, a single guiding rail is formed as the guiding elements of the first module 3304 and the second module 3305 are connected, i.e. the dowel pin 3202 is pushed into its corresponding hole (or vice versa).

The inventors noted that the use of dowel pins 3202 in combination with holes 3303 may serve as solid reference points to control the positioning of the modules adjacent to each other. The use of dowel pins 3202 in combination with their mating holes 3303 may result in less mechanical play between two adjacently placed modules 3304, 3305.

Control of the handling robot, by the control module, may be achieved via data and/or power connections integrated in the interconnecting guiding element 3301 or via separate cables connected between the handling robot and the control module.

Figure 21:
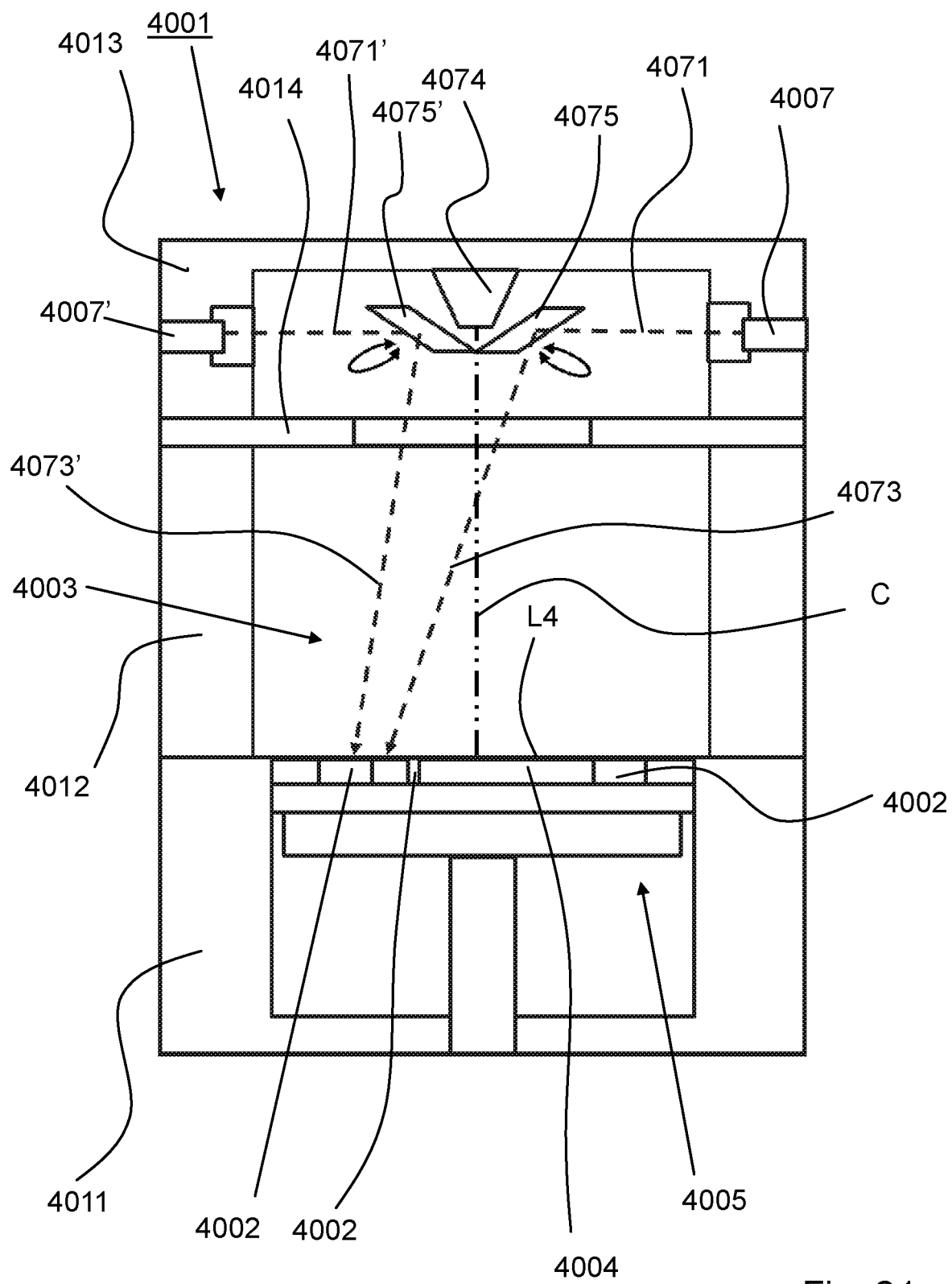
FIG. 21 is an overview of an apparatus according to the present invention from a fifth point of view for additive manufacturing an object.

FIG. 21 shows an overview of an apparatus 4001, for producing an object 4002 by means of additive manufacturing, according to an embodiment of the present invention. The apparatus 4001 is build from several frame parts 4011, 4012, 4013. The apparatus comprises a process chamber 4003 for receiving a bath of material 4004 which can be solidified. In a lower frame part 4011, a shaft is formed, wherein a support 4005 is provided for positioning the object 4002 in relation to the surface level L4 of the bath of material 4004. The support 4005 is movably provided in the shaft, such that after solidifying a layer, the support 4005 may be lowered, and a further layer of material may be solidified on top of the part of the object 4002 already formed. In a top part 4013 of the apparatus 4001, a first solidifying device 4007 is provided for solidifying a selective part of the material by means of electromagnetic radiation. As can be seen, the electromagnetic radiation 4071 emitted by the laser device 4007 is deflected by means of a first rotatable deflector unit 4075 to direct the emitted radiation 4071 towards the surface L4 of the layer of material 4004. In the top part 4013 of the apparatus 4001, a further solidifying device 4007 is provided for solidifying a further selective part of the material.

The top part 4013 of the apparatus 4001 also comprises a further solidifying device 4007 for solidifying a selective part of the material by means of electromagnetic radiation. As can be seen, the electromagnetic radiation 4071' emitted by the further laser device 4007' is deflected by means of a further rotatable deflector unit 4075' to direct the emitted radiation 4071' thereof towards the surface L4 of the layer of material 4004.

In the embodiment shown, the solidifying device 4007 and the further solidifying device 4007' are laser devices, which is arranged for producing electromagnetic radiation in the form of laser light, in order to melt a powdered material provided on the support, which then, after cooling forms a solidified part of the object to be produced. However, the invention is not limited to this type of solidifying device, but comprises in general solidifying devices that use electromagnetic radiation. Furthermore, the type of electromagnetic radiation emitted by the plurality of solidifying devices may be the same for each and every solidifying device, although it is conceivable that the type of electromagnetic radiation emitted by the plurality of solidifying devices differs for at least two of the plurality of solidifying devices.

It can be seen furthermore in FIG. 21, that the plurality of deflector means 4075, 4075' are positioned near a line C perpendicular to the plane defined by the object working area L4, and which line C passes through geometrical centre of gravity of the object working area L4. In other words, the deflector means 4075, 4075' are substantially provided above a centre part of the object working area L4. This allows each of the plurality of solidifying devices to easily reach substantially the entire object working area, such that, for instance, simultaneous solidifying of different parts of a single object may occur.

Figure 22:
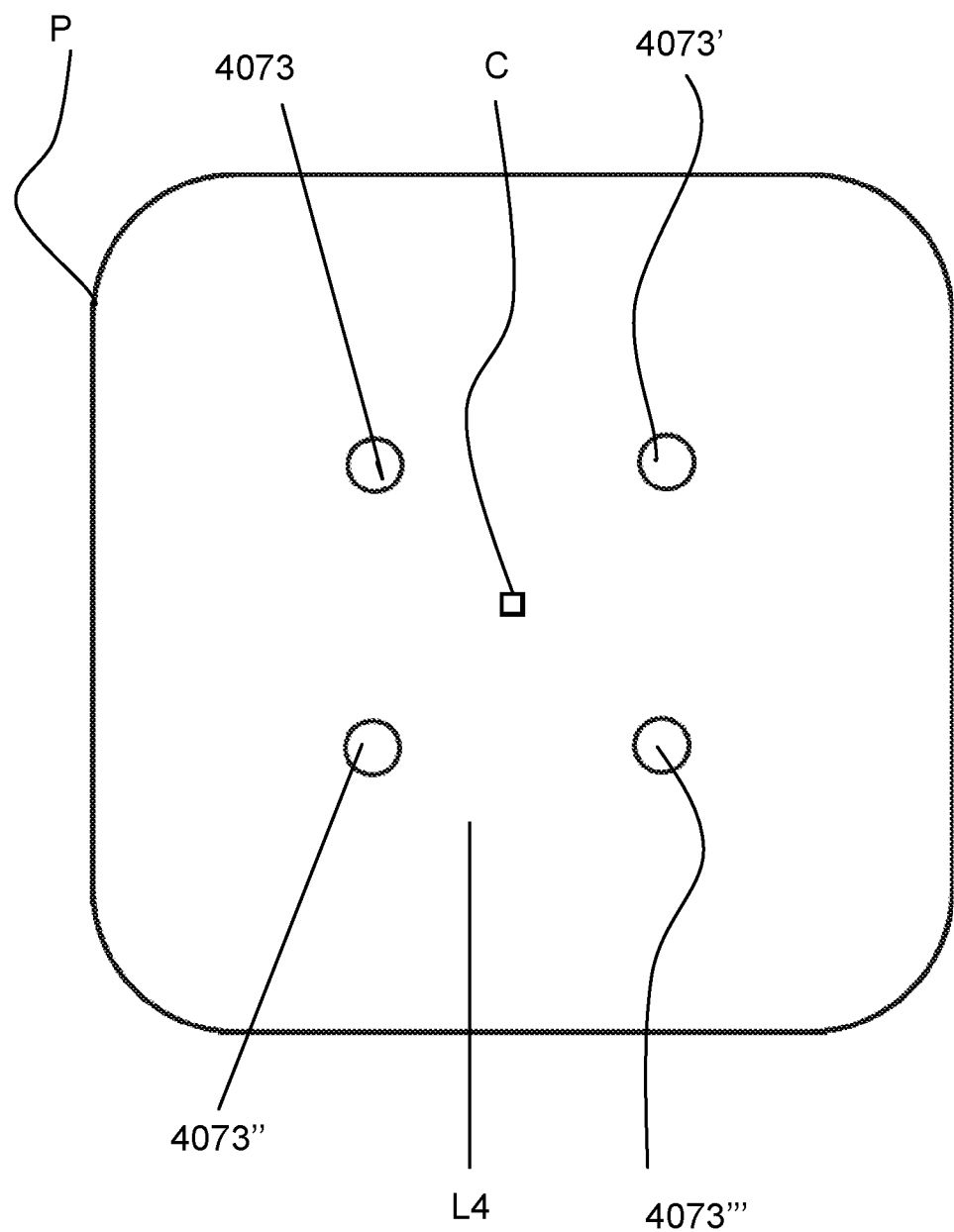
FIG. 22 is a top view of the object working area in the apparatus according to the invention from a fifth point of view.

The above will be better understood from FIG. 22, which shows a top view of the object working area L4. Here the apparatus comprises a total of four solidifying devices, each being able to direct a beam of electromagnetic radiation 4073-4073''' to the object working area. A total number of four devices provides for improved speed of manufacturing, whilst being able to keep a compact design of the apparatus, and whilst keeping total costs of the apparatus under control. Likewise, a total number of four deflector means may be provided. The four solidifying devices and four deflector means may be arranged in a geometrical pattern. FIG. 22 shows the central or neutral position of each of the electromagnetic radiation beams 4073-4073''', and said position may be changed, during operation of the apparatus, by means of deflecting the electromagnetic radiation via the plurality of deflector means. Since the plurality of deflector means are substantially located above the centre part C of the object working area, which means that the central or neutral position of each of the electromagnetic radiation beams 4073-4073''' is located more towards the centre part C than to a peripheral part P of the object working area, it is relatively easy for each of the plurality of beams of electromagnetic radiation to reach substantially the entire object working area. Thus, this enables, amongst others, to simultaneously solidify different parts of a single object.

Referring back to FIG. 21, it can be seen that the apparatus 4001 further comprises control means 4074 arranged for controlling the plurality of solidifying devices 4007, 4007', wherein the control means are arranged for simultaneously operating the plurality of solidifying devices 4007, 4007' in different parts of the object working area L4.

Thus, with the apparatus shown in FIG. 21, the plurality of solidifying devices 4007, 4007' may be controlled to work in substantially the entire object working area L4, such that it is possible to solidify different parts of a single object 4002 at the same time. By simultaneously solidifying different parts of a single object, this object may be produced more quickly, and total production time of the object may be decreased. The invention is described above by means of preferred embodiments.

Figure 23:
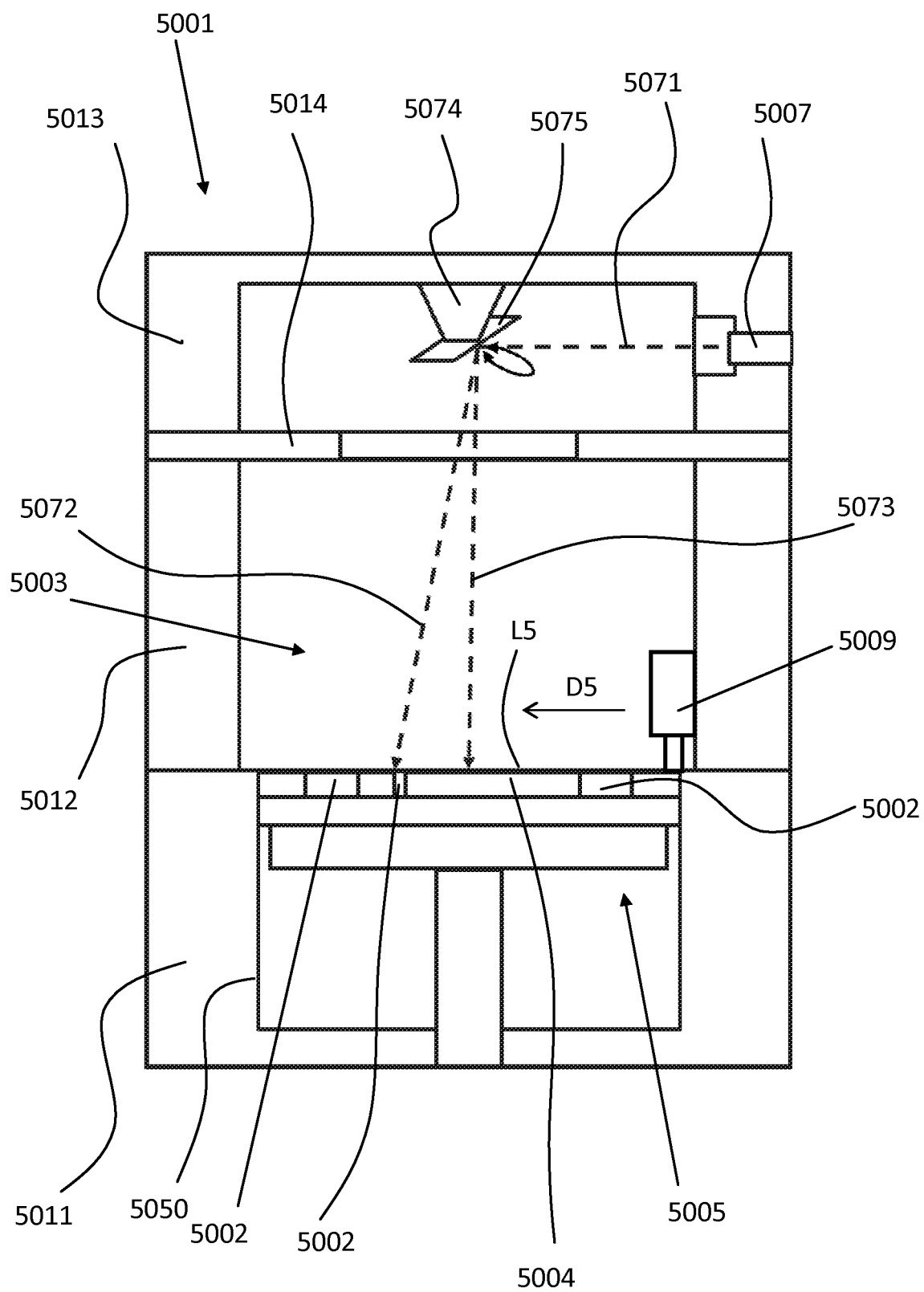
FIG. 23 is an overview of an apparatus according to the present invention from a sixth point of view for additive manufacturing an object.

FIG. 23 shows an overview of an apparatus 5001 for producing an object 5002 by means of additive manufacturing. The apparatus 5001 is build from several frame parts 5011, 5012, 5013. The apparatus comprises a process chamber 5003 for receiving a bath of material 5004 which can be solidified. In a lower frame part 5011, a shaft is formed, wherein a support 5005 is provided for positioning the object 5002 in relation to the surface level L5 of the bath of material 5004. The support 5005 is movably provided in the shaft, such that after solidifying a layer, the support 5005 may be lowered, and a further layer of material may be solidified on top of the part of the object 5002 already formed. In a top part 5013 of the apparatus 5001, a solidifying device 5007 is provided for solidifying a selective part of the material. In the embodiment shown, the solidifying device 5007 is a laser device, which is arranged for producing electromagnetic radiation in the form of laser light, in order to melt a powdered material provided on the support, which then, after cooling forms a solidified part of the object to be produced. However, the invention is not limited to the type of solidifying device. As can be seen, the electromagnetic radiation 5071 emitted by the laser device 5007 is deflected by means of a deflector unit 5074, which uses a rotatable optical element 5075 to direct the emitted radiation 5071 towards the surface L5 of the layer of material 5004. Depending on the position of the deflector unit 5074, radiation may be emitted, as an example, according to rays 5072, 5073.

Figure 24:
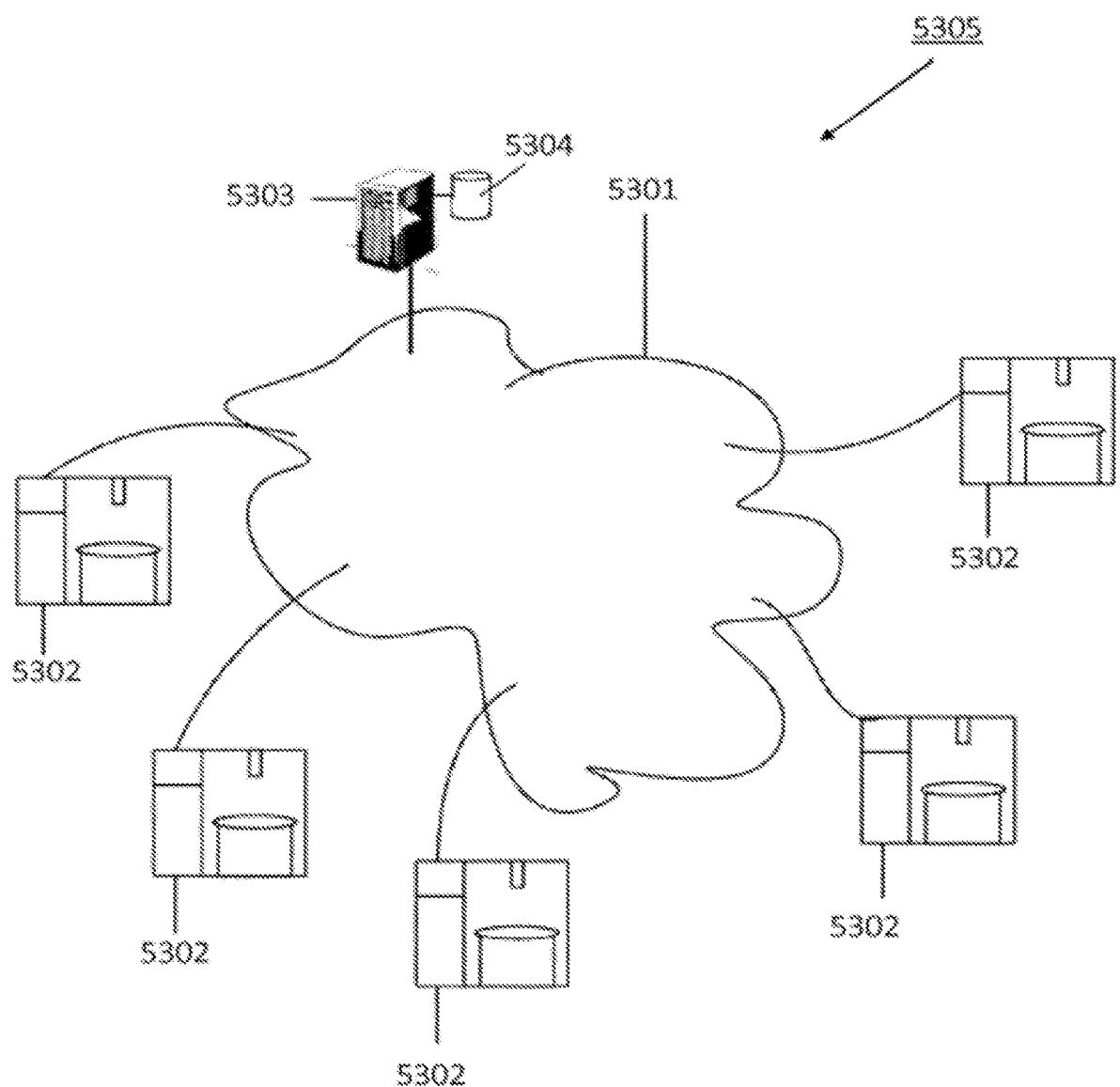
FIG. 24 discloses an overview of a system for managing production of objects by means of additive manufacturing according to the present invention from a sixth point of view.

FIG. 24 discloses an overview of a system 5105 for managing production of objects by means of additive manufacturing. The system 5105 comprises a plurality of apparatuses 5102, each of which connected to a public network. The apparatuses 5102 are suitable for producing an object by means of additive manufacturing, wherein each apparatus 5102 comprises a process chamber for receiving a bath of material which can be solidified, a solidifying device for solidifying a selective part of the material for producing the object, a control device for controlling the apparatus for producing the object based on a print job, and interface means arranged for receiving the print job over a public network 5101.

The system 5105 further comprises a central server 5103, which central server has a database 5104 for storing geographical location information of the plurality of apparatuses 5102. The geographical location information may be manually inputted in the database 5104 once an apparatus has been sold, or the geographical location information may be automatically updated in the database by the central server 5103, for example every time the central server 5103 receives updated geographical location information from any of the plurality of apparatuses 5102.

The central server 5103 is responsible for distributing print jobs over the plurality of apparatuses 5102. Hereto, the central server 5103 selects one of the apparatuses 5102 to be used for producing the corresponding object. The selection process is at least based on the geographical location information of the plurality of apparatuses 5102.

Figure 25:
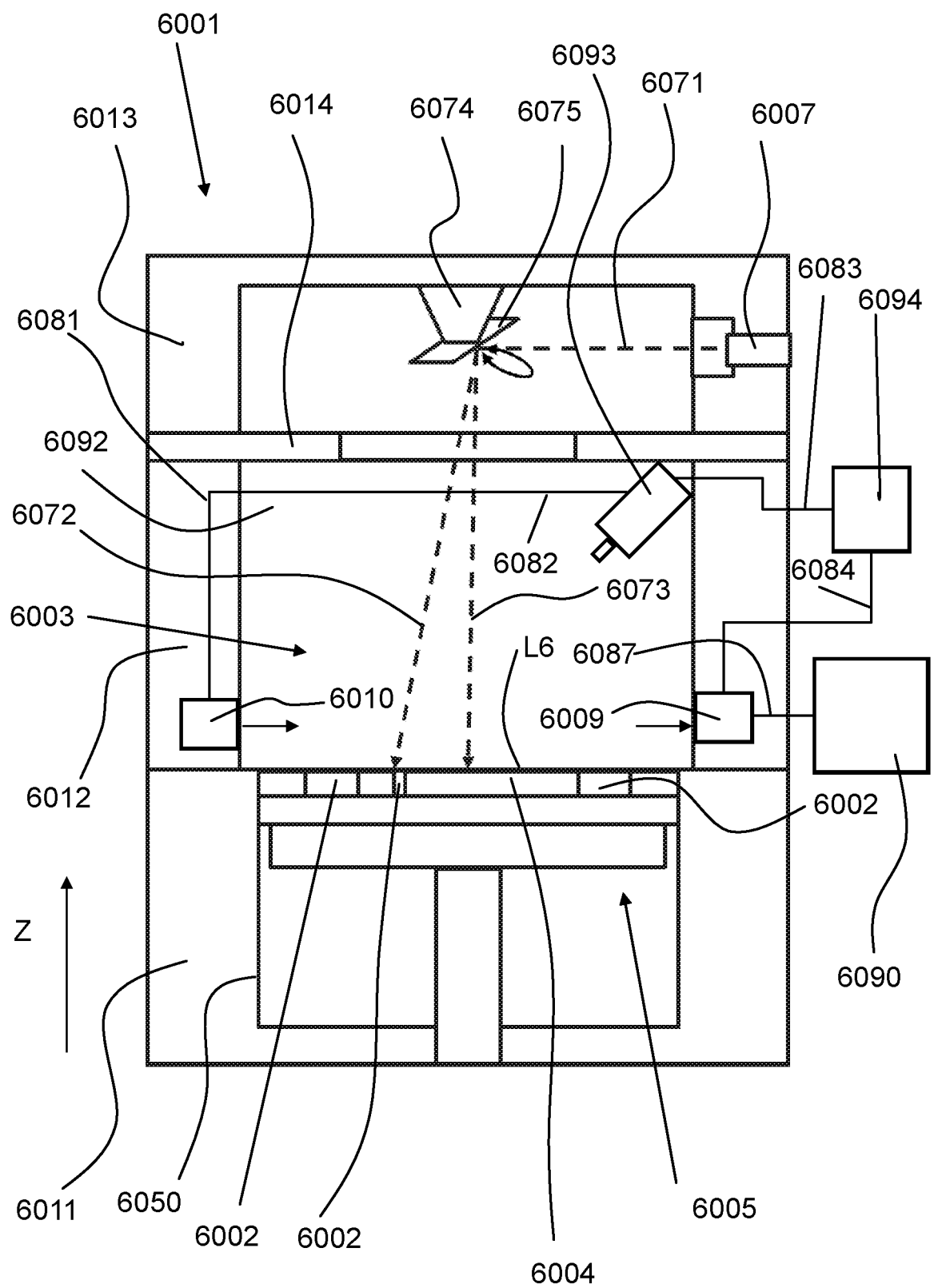
FIG. 25 is an overview of an apparatus according to the present invention from a seventh point of view for additive manufacturing an object.

FIG. 25 shows an overview of an apparatus 6001 for producing an object 6002 by means of additive manufacturing. The apparatus 6001 is build from several frame parts 6011, 6012, 6013. The apparatus comprises a process chamber 6003 for receiving a bath of material 6004 which can be solidified. In a lower frame part 6011, a shaft 6050 is formed, wherein a support 6005 is provided for positioning the object 6002 in relation to the surface level L6 of the bath of material 6004. The support 6005 is movably provided in the shaft 6050, such that after solidifying a layer, the support 6005 may be lowered, and a further layer of material may be solidified on top of the part of the object 6002 already formed. In a top part 6013 of the apparatus 6001, a solidifying device 6007 is provided for solidifying a selective part of the material. In the embodiment shown, the solidifying device 6007 is a laser device, which is arranged for producing electromagnetic radiation in the form of laser light, in order to melt a powdered material provided on the support, which then, after cooling forms a solidified part of the object 6002 to be produced. However, the invention is not limited to the type of solidifying device 6007. As can be seen, the electromagnetic radiation 6071 emitted by the laser device 6007 is deflected by means of a deflector unit 6074, which uses a rotatable optical element 6075 to direct the emitted radiation 6071 towards the surface L6 of the layer of material 6004. Depending on the position of the deflector unit 6074, radiation may be emitted, as an example, according to rays 6072, 6073.

Figure 26:
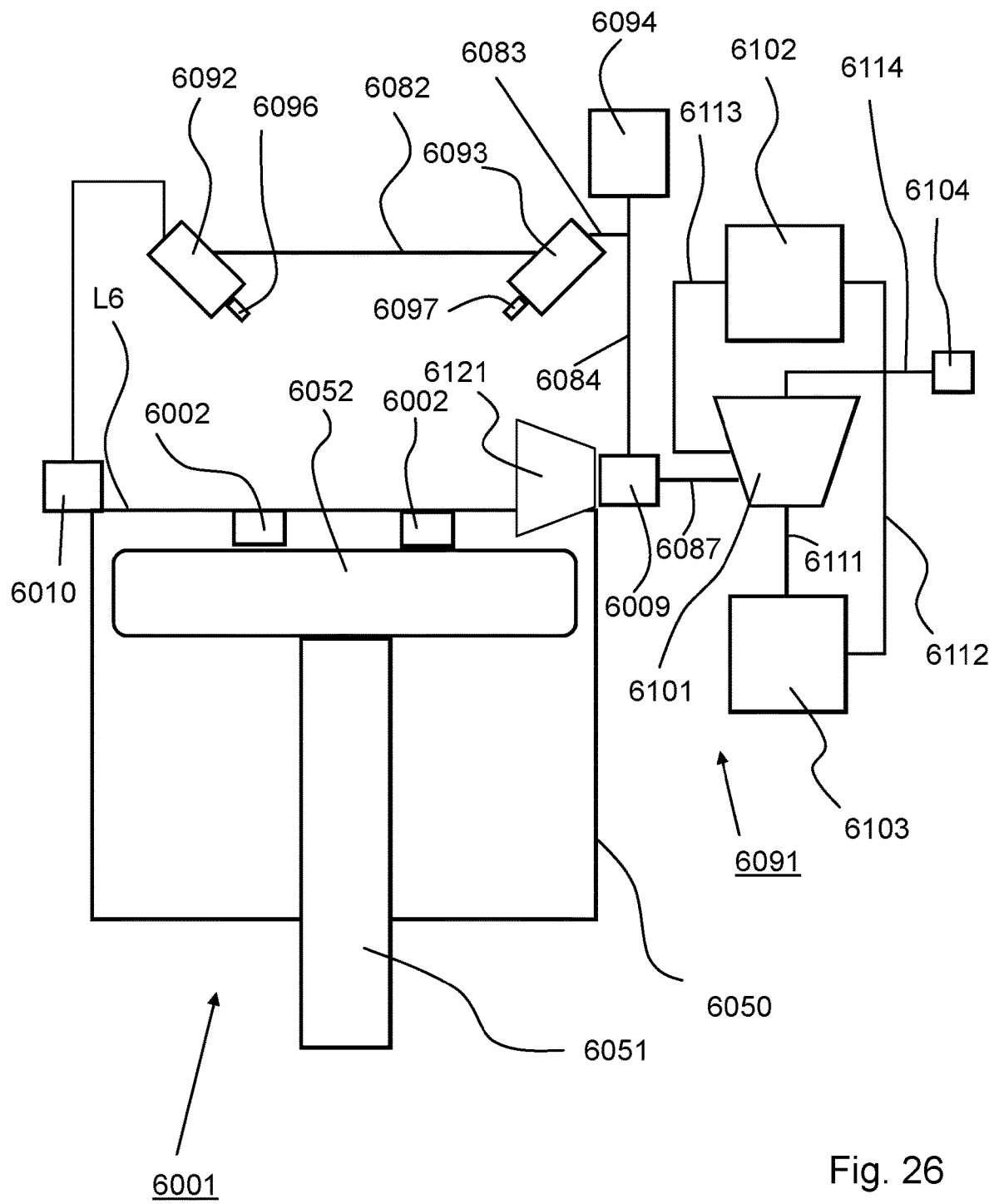
FIG. 26 is a schematic overview of an embodiment of the apparatus according to the invention from a seventh point of view.

The apparatus 6001 shown further comprises an extraction device 6009 fluidly connected to the process chamber 6003 and arranged for extracting material 6004 out of the process chamber. Blowing means 6010 are provided on the opposite side of the process chamber 6003 for inducing a gaseous flow in the process chamber 6003 effecting the material to be extracted. Furthermore, a further blowing means 6093 is provided above, and directed to, the level L6 of material 6004. Thus, as follows from FIG. 25, the blowing means 6010, 6093 comprise a first blow nozzle 6010 provided on the left hand side, as seen in FIG. 26, of the process chamber 6003 and directed to the extraction means 6009. The blowing means 6010, 6093 further comprise a second blow nozzle 6093 provided on the top right hand side, as seen in FIG. 26, of the process chamber 6003 and directed to the center of the level L6 of the material 6004. It can thus readily be seen that the first blow nozzle 6010 and the second blow nozzle 6093 are directed in opposite directions. In effect, a plurality of blow nozzles 6010, 6093 are provided that are fluidly connected to the process chamber 6003 and directed in a plurality of different directions. With this, the blowing means are able to affect a larger part of the surface level L6 of the material 6004, such that in principle more material is taken up by the gaseous stream and may be extracted by means of the extraction device 6009.

In particular, the first blow nozzle 6010 is arranged to provide a relatively large volume flow at a relatively low pressure, and the second blow nozzle 6093 is arranged for providing a relatively small volume flow at a relatively high pressure. The first blow nozzle 6010 is arranged for providing a volume flow that substantially corresponds to the volume extracted by the extraction means 6009. The second blow nozzle 6093 is arranged for providing bursts of flow, provided at a relatively high pressure, for inducing local disturbances in the flowing pattern, for instance turbulences, to affect a larger amount of material on the surface level L6 of the process chamber 6003.

In the embodiment shown in FIG. 25, the first 6010 and second 6093 blowing nozzles are connected, via lines 6082 and 6084, to a control unit 6094, which may be used to start and/or stop the blowing nozzles 6010, 6093. The extraction device 6009, for instance in the form of a suction device 6009, is also connected to this control unit 6094, such that operation thereof may be synchronized. It is, however, conceivable that the extraction device 6009 is provided with a separate control unit. FIG. 26 further shows that the extraction device 6009 is connected to a holder 6090 for holding the material 6004 extracted from the process chamber, for instance for later re-use.

The nozzles 6010 in FIG. 25 is embodied as a stationary nozzle, and the nozzle 6093 may be embodied as a movable nozzle. Driving means may be provided (not shown), which are known per se, and that may be used to aim the nozzle to different parts of the processing chamber 6003, in particular during blowing of the nozzles. This way, the jet released by the nozzle may be aimed, randomly or deliberately, towards different parts of the surface level L6 of the bath of material 6004. For instance, the nozzle may be tilted up and down, or moved from left to right, during deliberate aiming. In an embodiment, the free end of the movable nozzle is freely movable, for instance in the form of a freely movable flexible hose or tube, such that the least one movable nozzle is arranged to be moved by the flow discharged by said movable nozzle. This induces a randomized flow in the process chamber 6003 during blowing of the nozzle, which leads to an improved chance of picking up and extracting more material. Further nozzles may be provided, which may be movable nozzles as described above.

FIG. 26 shows an embodiment of the apparatus according to the invention, having two additional nozzles 6092, 6093, which may be movable nozzles 6092, 6093, and in which in particular details of the apparatus downstream of the extraction device 6009 are shown. The extraction device 6009 comprises an extraction tube 6121 comprising a pumping unit (shown as one unit 6121), wherein an inlet opening of the extraction tube 6121 is positioned within the process chamber 6003. Furthermore, the extraction device 6009 is fluidly connected, via line 6087, to a filter unit 6101, in particular a cyclone filter unit 6101, which may be used to filter the extracted gaseous flow containing the material extracted from the process chamber. For instance, this allows powdered material contained in the flow to be filtered and collected for further usage. The cyclone filter unit 6101 is connected, via line 6111, to a first holder 6103 or collector, for collecting powdered material filtered by the filter unit 6101. The gaseous flow may, after having passed the filter unit 6101, be exhausted by the apparatus by means of exhaust tube 6114 and exhaust outlet 6104. In this way, the gaseous flow may be vented through the exhaust tube 6114 and outlet 6104. In a preferred embodiment, the exhaust tube 6114 is connected to the blowing means 6010, such that the filtered gas flow may once again be introduced into the process chamber.

The first holder 6103 is connected, via line 6112, to a second holder 6102, provided above the first holder 103. Material collected in the first holder 6103 may be transferred via line 6112 to the second holder 6102, for later use. An overflow line 6113 is provided between the second holder 6102 and the filter unit 6101, which may be used to filter the extracted material a plurality of times, by re-feeding said material back to the filter unit a number of times, for instance.

Thus, the extraction device 6009 may be connected to one or more holders 6103, 6102 for holding material extracted from the process chamber. This material may be re-used, for instance for laying down a further layer of material to be solidified.

Figure 27:
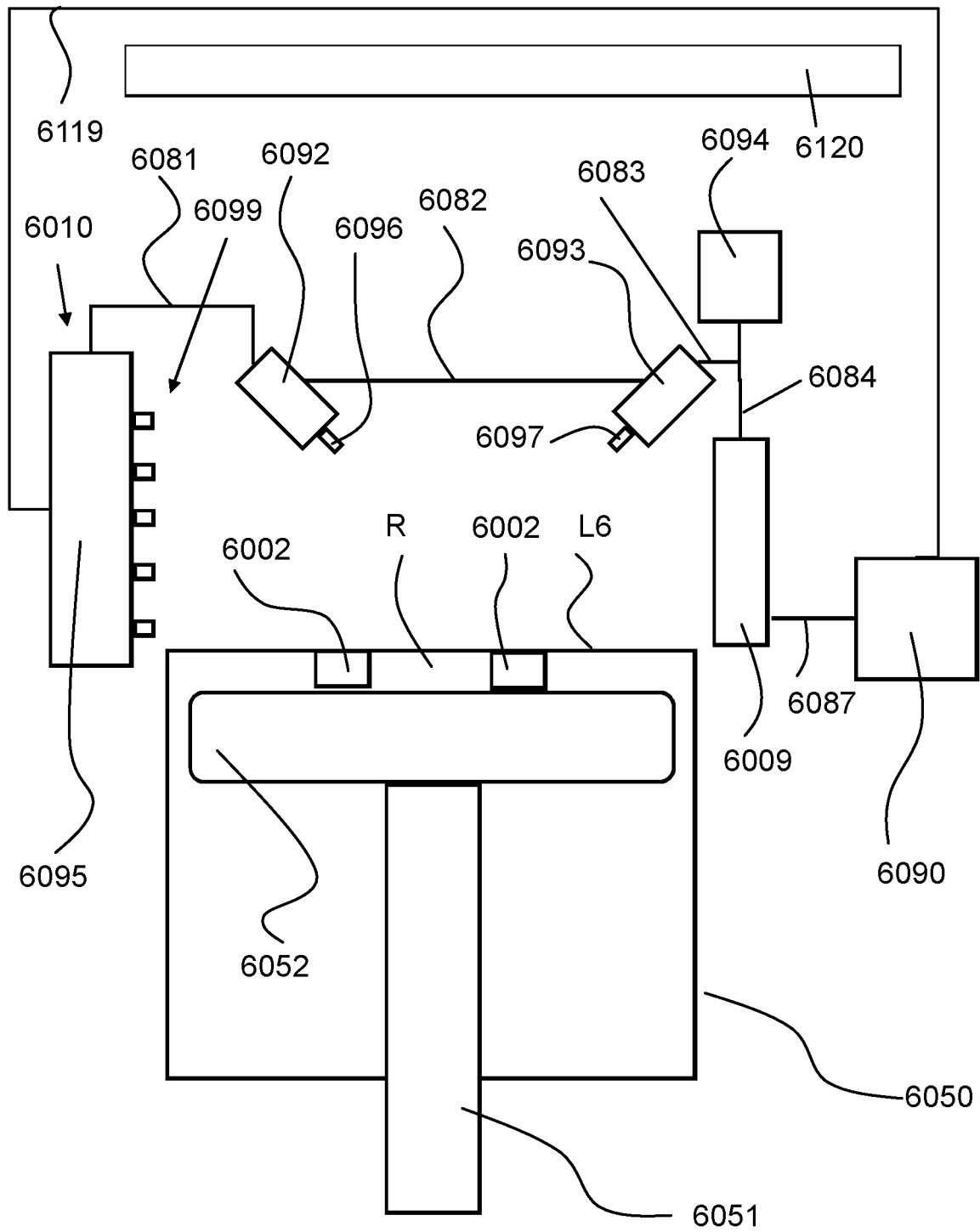
FIG. 27 is a schematic overview of a further embodiment of the apparatus according to the invention from a seventh point of view.

FIG. 27 shows a further embodiment of the apparatus according to the invention, which mainly differs from the embodiment shown in FIG. 25 in that the blowing means 6010 comprise a blowing unit 6095 having a plurality of blowing nozzles 6099 is. The nozzles 6099 of this blowing unit 6095 are directed towards the extraction device 6009, in order to blow material 6004 from the process chamber 6003 towards the extraction device. The nozzles 6099 are, in the embodiment shown, mainly directed in a horizontal direction. The nozzles 6099 are, in an embodiment, arranged for being stationary, such that a generally horizontal flow towards the extraction device 6009 is obtained. To improve the extraction of material 6004, the nozzle 6093 is provided and directed in a different direction relative to the nozzles 6099 of the further blowing unit 6095. This ensures that material positioned partly behind the object 6002, when viewed in the blowing direction of the nozzles 6099 of the further blowing unit 6095, as indicated by region R in FIG. 27, may be affected by the nozzle 6093, such that removal of material in this region R is also possible. To enhance the extraction of material 6004, one or more of the nozzles 6099, 6092, 6097 shown in FIG. 27, and in particular one of the nozzles 6092 and 6093, may be embodied as movable nozzles.

Furthermore, FIG. 27 schematically shows that the apparatus comprises a movable cover-element 6120, which is arranged to be movable within the process chamber 6003 for covering a top part of the process chamber during use of the blowing means 6010 and extraction means 6009. The movable cover-element 6120 may then be used to divide the volume of the process chamber into two parts, such that the volume of the part comprising the bath of material is reduced. This increases the ease with which the powdered material can be removed from the process chamber, and ensures furthermore that the other part is protected by the cover-element, in such a way that damage to the apparatus in this other part due to moving powdered particles is prevented. The cover-element 6120 may be embodied as a pivotable element, or a translatable element.

The first to seventh point of view may be incorporated independently from each other, which different points of view have been described above. In particular, the protection sought is defined in the attached claims. Alternative views may be described by the following clauses.

The invention claimed is:
1. An apparatus for producing an object by an additive manufacturing process, the apparatus comprising:
 a process chamber for receiving a bath of material;
 a support for positioning an object to be produced in relation to a surface level of the bath of material;

a solidifying device for emitting electromagnetic radiation to solidify a portion of the bath of material at the surface level to form a layer of the object to be produced;

a deflector unit for directing the emitted electromagnetic radiation towards the surface level of the bath of material;

at least one camera configured to register a geometric characteristic of at least one calibration element from at least one image captured by the at least one camera; and a control unit communicatively coupled to the at least one camera and communicatively coupled to at least one of the solidifying device and the deflector unit, the control unit configured to process the at least one image to determine the geometric characteristic of the at least one calibration element, and the control unit operable for controlling at least one of the solidifying device and the deflector unit to control a position of the emitted electromagnetic radiation at the surface level of the bath of material based on the registered geometric characteristic;

wherein the at least one camera is positioned relative to the deflector unit such that the at least one image is captured via the deflector unit.

2. The apparatus according to claim 1, wherein the geometric characteristic corresponds to an XY position of the at least one calibration element in a plane provided at the surface level of the bath of material.

3. The apparatus according to claim 1, wherein the geometric characteristic comprises at least one of a circle, parallel lines, a triangle, a pentagon, and a spot.

4. The apparatus according to claim 1, wherein the at least one calibration element is provided in a calibration area at the surface level of the bath of material.

5. The apparatus according to claim 1, wherein the at least one camera is positioned relative to the solidifying device such that an optical path of the at least one camera at least partly coincides with an optical path of the emitted electromagnetic radiation.

6. The apparatus according to claim 1, wherein the at least one calibration element comprises a plurality of calibration elements provided on or proximate the support, and wherein at least one of the plurality of calibration elements is assigned to a registering frame comprising the at least one camera, and wherein at least one of the plurality of calibration elements is assigned to a support frame comprising the support.

7. The apparatus according to claim 1, wherein the support is provided on a shaft, the shaft movable to position the support relative to the surface level of the bath of material.

8. The apparatus according to claim 1, wherein the solidifying device is positioned in an upper portion of the apparatus and is configured to produce laser light.

9. The apparatus according to claim 1, wherein the at least one calibration element is provided on the support.

* * * * *